(12) United States Patent
Mueller et al.

(10) Patent No.: US 8,533,003 B2
(45) Date of Patent: *Sep. 10, 2013

(54) METHOD AND APPARATUS FOR SELECTING A SUPPLEMENTAL PRODUCT TO OFFER FOR SALE DURING A TRANSACTION

(75) Inventors: Raymond J. Mueller, Palm Beach Gardens, FL (US); David H. Douglas, Darien, CT (US); Andrew S. Van Luchene, Santa Fe, NM (US); George M. Marrazzo, Camilus, NY (US); Shane Whalquist, Copell, TX (US)

(73) Assignee: Walker Digital, LLC, Stamford, CT (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/356,890

(22) Filed: Jan. 24, 2012

(65) Prior Publication Data

US 2012/0123864 A1    May 17, 2012

Related U.S. Application Data

(63) Continuation of application No. 12/365,629, filed on Feb. 4, 2009, now Pat. No. 8,103,520, which is a continuation of application No. 09/603,677, filed on Jun. 26, 2000, now Pat. No. 7,542,919, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(60) Provisional application No. 60/190,818, filed on Mar. 21, 2000.

(51) Int. Cl.
*G06Q 10/00* (2012.01)
*G06Q 20/00* (2012.01)

(52) U.S. Cl.
USPC .............................................. 705/1.1; 705/16

(58) Field of Classification Search
USPC .................................. 705/1.1, 16, 17
See application file for complete search history.

(56) References Cited

U.S. PATENT DOCUMENTS

RE25,600 E    6/1964   Goldwater et al.
3,222,189 A   12/1965  Perrozzi (Continued)

FOREIGN PATENT DOCUMENTS

DE    40 09 980 A1    1/1991
EP    0 085 546 A2    8/1983

(Continued)

OTHER PUBLICATIONS

Schwall, Benjamin, "Let's Play the Cash Register Receipts Lottery", The New York Times, Dec. 25, 1990, Section 1 at p. 30, 1pg.

(Continued)

*Primary Examiner* — Jami A Plucinski
*Assistant Examiner* — Sangeeta Bahl
(74) *Attorney, Agent, or Firm* — Fincham Downs, LLC; Michael D. Downs

(57) ABSTRACT

According to some embodiments, a supplemental product or service may be offered to a user during a transaction, either in addition to products and/or services the user is purchasing, or as a replacement to one or more of the products and/or services that the user is purchasing. The functionality may be implemented, for example, in a retail embodiment where a user is purchasing products and/or services at a cash register or other point-of-sale terminal. One or more embodiments may be implemented online where a user is purchasing products and/or services using a computer, terminal, telephone or other client or user device and accessing a World Wide Web site, online catalog, interactive voice response unit or system, etc.

18 Claims, 22 Drawing Sheets

(56) References Cited

U.S. PATENT DOCUMENTS

| | | |
|---|---|---|
| 3,573,747 A | 4/1971 | Adams |
| 3,637,999 A | 1/1972 | Pappas |
| 4,030,632 A | 6/1977 | Harashima |
| 4,108,361 A | 8/1978 | Krause ............... 235/375 |
| 4,120,452 A | 10/1978 | Kimura et al. |
| 4,157,829 A | 6/1979 | Goldman |
| 4,323,770 A | 4/1982 | Dieulot et al. ............ 235/375 |
| 4,441,160 A | 4/1984 | Azcua et al. |
| 4,494,197 A | 1/1985 | Troy et al. ............... 364/412 |
| 4,500,880 A | 2/1985 | Gomersall et al. |
| 4,669,730 A | 6/1987 | Small ............... 273/138 A |
| 4,677,553 A | 6/1987 | Roberts et al. ............ 364/412 |
| 4,689,742 A | 8/1987 | Troy et al. ............... 364/412 |
| 4,723,212 A | 2/1988 | Mindrum et al. |
| 4,760,247 A | 7/1988 | Keane et al. ............ 235/454 |
| 4,764,666 A | 8/1988 | Bergeron |
| 4,815,741 A | 3/1989 | Small ............... 273/138 A |
| 4,825,045 A | 4/1989 | Humble |
| 4,832,341 A | 5/1989 | Muller et al. |
| 4,839,507 A | 6/1989 | May ............... 235/381 |
| 4,854,590 A | 8/1989 | Jolliff et al. ............ 273/138 A |
| 4,859,838 A | 8/1989 | Okiharu ............... 235/383 |
| 4,876,592 A | 10/1989 | Von Kohorn |
| 4,882,473 A | 11/1989 | Bergeron et al. ............ 235/380 |
| 4,902,880 A | 2/1990 | Garczynski et al. |
| 4,908,761 A | 3/1990 | Tai |
| 4,910,672 A | 3/1990 | Off et al. |
| 4,922,522 A | 5/1990 | Scanlon ............... 379/95 |
| 4,937,853 A | 6/1990 | Brule et al. ............... 379/96 |
| 4,973,952 A | 11/1990 | Malec et al. ............ 340/825.35 |
| 4,982,337 A | 1/1991 | Burr et al. ............... 364/479 |
| 4,993,714 A | 2/1991 | Golightly ............... 273/138 A |
| 5,025,372 A | 6/1991 | Burton et al. |
| 5,053,957 A | 10/1991 | Suzuki |
| 5,056,019 A | 10/1991 | Schultz et al. |
| 5,112,050 A | 5/1992 | Koza |
| 5,119,295 A | 6/1992 | Kapur ............... 364/412 |
| 5,128,862 A | 7/1992 | Mueller |
| 5,132,914 A | 7/1992 | Cahlander et al. |
| 5,158,293 A | 10/1992 | Mullins |
| 5,172,328 A | 12/1992 | Cahlander et al. |
| 5,173,851 A | 12/1992 | Off et al. |
| 5,177,342 A | 1/1993 | Adams |
| 5,186,463 A | 2/1993 | Marin |
| 5,192,854 A | 3/1993 | Counts |
| 5,193,056 A | 3/1993 | Boes |
| 5,200,889 A | 4/1993 | Mori |
| 5,201,010 A | 4/1993 | Deaton et al. |
| 5,216,595 A | 6/1993 | Protheroe ............... 364/412 |
| 5,223,698 A | 6/1993 | Kapur |
| 5,231,569 A | 7/1993 | Myatt et al. |
| 5,235,509 A | 8/1993 | Mueller et al. |
| 5,239,165 A | 8/1993 | Novak ............... 235/375 |
| 5,243,515 A | 9/1993 | Lee |
| 5,245,533 A | 9/1993 | Marshall |
| 5,256,863 A | 10/1993 | Ferguson et al. |
| 5,260,553 A | 11/1993 | Rockstein et al. |
| 5,262,941 A | 11/1993 | Saladin et al. |
| 5,269,521 A | 12/1993 | Rossides |
| 5,274,547 A | 12/1993 | Zoffel et al. |
| 5,283,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,302,811 A | 4/1994 | Fukatsu |
| 5,305,195 A | 4/1994 | Murphy |
| 5,309,355 A | 5/1994 | Lockwood |
| 5,327,508 A | 7/1994 | Deaton |
| D351,166 S | 10/1994 | Wan |
| 5,353,218 A | 10/1994 | De Lapa et al. |
| 5,353,219 A | 10/1994 | Mueller et al. |
| 5,355,327 A | 10/1994 | Stent et al. |
| 5,371,345 A | 12/1994 | LeStrange et al. |
| 5,371,796 A | 12/1994 | Avarne |
| 5,380,991 A | 1/1995 | Valencia et al. |
| 5,398,932 A | 3/1995 | Eberhardt |
| RE34,915 E | 4/1995 | Nichtberger et al. |
| 5,408,210 A | 4/1995 | Oka |
| 5,417,424 A | 5/1995 | Snowden et al. |
| 5,420,606 A | 5/1995 | Begum et al. ............... 345/156 |
| 5,428,606 A | 6/1995 | Moskowitz |
| 5,440,108 A | 8/1995 | Tran et al. |
| 5,450,938 A | 9/1995 | Rademacher |
| 5,459,306 A | 10/1995 | Stein et al. |
| 5,464,971 A | 11/1995 | Sutcliffe et al. |
| 5,465,085 A | 11/1995 | Caldwell et al. |
| 5,466,919 A | 11/1995 | Hovakimian |
| 5,475,205 A | 12/1995 | Behm |
| 5,476,259 A | 12/1995 | Weingardt |
| 5,481,094 A | 1/1996 | Suda |
| 5,491,326 A | 2/1996 | Marceau et al. |
| 5,502,636 A | 3/1996 | Clarke |
| 5,504,475 A | 4/1996 | Houdou et al. |
| 5,504,675 A | 4/1996 | Cragun et al. |
| 5,505,449 A | 4/1996 | Eberhardt |
| 5,510,979 A | 4/1996 | Moderi et al. |
| 5,518,239 A | 5/1996 | Johnston |
| 5,521,364 A | 5/1996 | Kimura et al. |
| 5,526,257 A | 6/1996 | Lerner |
| 5,528,490 A | 6/1996 | Hill |
| 5,537,314 A | 7/1996 | Kanter |
| 5,539,189 A | 7/1996 | Wilson ............... 235/379 |
| 5,544,040 A | 8/1996 | Gerbaulet |
| 5,557,513 A | 9/1996 | Frey et al. |
| 5,564,546 A | 10/1996 | Molbak et al. ............... 194/216 |
| 5,564,977 A | 10/1996 | Algie |
| 5,572,653 A | 11/1996 | DeTemple et al. ............ 395/501 |
| 5,576,951 A | 11/1996 | Lockwood |
| 5,581,064 A | 12/1996 | Riley et al. ............... 235/383 |
| 5,583,763 A | 12/1996 | Atcheson et al. |
| 5,592,375 A | 1/1997 | Salmon et al. ............... 395/207 |
| 5,592,376 A | 1/1997 | Hodroff ............... 395/214 |
| 5,592,560 A | 1/1997 | Deaton et al. |
| 5,602,377 A | 2/1997 | Beller et al. ............... 235/462 |
| 5,604,343 A | 2/1997 | Curry et al. |
| 5,611,052 A | 3/1997 | Dykstra et al. ............... 395/238 |
| 5,612,868 A | 3/1997 | Off et al. |
| 5,613,679 A | 3/1997 | Casa |
| 5,615,269 A | 3/1997 | Micali |
| 5,619,558 A | 4/1997 | Jheeta ............... 379/90 |
| 5,620,079 A | 4/1997 | Molbak ............... 194/217 |
| 5,620,182 A | 4/1997 | Rossides |
| 5,621,201 A | 4/1997 | Langhans et al. |
| 5,621,640 A | 4/1997 | Burke |
| 5,621,812 A | 4/1997 | Deaton |
| 5,630,103 A | 5/1997 | Smith et al. |
| 5,632,010 A | 5/1997 | Briechle et al. |
| 5,638,457 A | 6/1997 | Deaton et al. |
| 5,642,484 A | 6/1997 | Harrison, III et al. |
| 5,642,485 A | 6/1997 | Deaton et al. |
| 5,644,723 A | 7/1997 | Deaton et al. |
| 5,645,486 A | 7/1997 | Nagao |
| 5,649,114 A | 7/1997 | Deaton |
| 5,652,421 A | 7/1997 | Venneman |
| 5,655,007 A | 8/1997 | McAllister |
| 5,664,115 A | 9/1997 | Fraser |
| 5,665,953 A | 9/1997 | Mazzamuto et al. |
| 5,687,322 A | 11/1997 | Deaton et al. ............... 395/214 |
| 5,694,546 A | 12/1997 | Reisman |
| 5,710,887 A | 1/1998 | Chelliah |
| 5,717,866 A | 2/1998 | Naftzger |
| 5,724,886 A | 3/1998 | Ewald et al. |
| 5,759,101 A | 6/1998 | Von Kohorn |
| 5,772,510 A | 6/1998 | Roberts |
| 5,774,868 A | 6/1998 | Cragun et al. |
| 5,794,210 A | 8/1998 | Goldhaber et al. |
| 5,806,045 A | 9/1998 | Biorge et al. |
| 5,822,735 A | 10/1998 | DeLapa et al. |
| 5,832,457 A | 11/1998 | O'Brien et al. |
| 5,845,259 A | 12/1998 | West et al. |
| 5,845,263 A | 12/1998 | Camaisa et al. |
| 5,845,276 A | 12/1998 | Emerson et al. |
| 5,857,175 A | 1/1999 | Day et al. |
| 5,869,826 A | 2/1999 | Eleftheriou |

| | | | |
|---|---|---|---|
| 5,880,449 A | 3/1999 | Teicher et al. | |
| 5,884,272 A | 3/1999 | Walker et al. | |
| 5,890,718 A | 4/1999 | Byon | |
| 5,918,209 A | 6/1999 | Campbell et al. | |
| 5,923,016 A | 7/1999 | Fredregill et al. | |
| 5,924,077 A | 7/1999 | Beach et al. | |
| 5,926,796 A | 7/1999 | Walker et al. | |
| 5,930,771 A | 7/1999 | Stapp | |
| 5,946,665 A | 8/1999 | Suzuki | |
| 5,966,695 A | 10/1999 | Melchione et al. | |
| 5,974,399 A | 10/1999 | Giuliani et al. | |
| 5,999,914 A | 12/1999 | Blinn et al. | 705/26 |
| 6,014,634 A | 1/2000 | Scroggie et al. | |
| 6,014,641 A | 1/2000 | Loeb et al. | |
| 6,021,390 A | 2/2000 | Satoh et al. | |
| 6,024,288 A | 2/2000 | Gottlich et al. | |
| 6,029,139 A | 2/2000 | Cunningham et al. | |
| 6,029,153 A | 2/2000 | Bauchner et al. | |
| 6,039,244 A | 3/2000 | Finsterwald | |
| 6,055,513 A | 4/2000 | Katz et al. | |
| 6,061,660 A | 5/2000 | Eggleston et al. | |
| 6,064,987 A | 5/2000 | Walker et al. | 705/38 |
| 6,070,147 A | 5/2000 | Harms et al. | 705/14 |
| 6,080,062 A | 6/2000 | Olson | |
| 6,085,164 A | 7/2000 | Smith et al. | |
| 6,088,682 A | 7/2000 | Burke | 705/17 |
| 6,112,191 A | 8/2000 | Burke | 705/41 |
| 6,119,099 A | 9/2000 | Walker et al. | |
| 6,131,399 A | 10/2000 | Hall | |
| 6,138,105 A | 10/2000 | Walker et al. | 705/10 |
| 6,164,533 A | 12/2000 | Barton | |
| 6,223,163 B1 | 4/2001 | Van Luchene | 705/1 |
| 6,229,879 B1 | 5/2001 | Walker et al. | |
| 6,253,188 B1 | 6/2001 | Witek et al. | |
| 6,267,670 B1 | 7/2001 | Walker et al. | |
| 6,292,786 B1 | 9/2001 | Deaton et al. | |
| 6,296,569 B1 | 10/2001 | Congello | |
| 6,298,329 B1 | 10/2001 | Walker et al. | 705/14 |
| 6,298,331 B1 | 10/2001 | Walker et al. | 705/15 |
| 6,307,958 B1 | 10/2001 | Deaton et al. | |
| 6,321,210 B1 | 11/2001 | O'Brien et al. | |
| 6,397,193 B1 | 5/2002 | Walker et al. | |
| 6,463,585 B1 | 10/2002 | Hendricks et al. | |
| 6,484,149 B1 | 11/2002 | Jammes et al. | |
| 6,484,158 B1 | 11/2002 | Johnson et al. | |
| 6,515,680 B1 | 2/2003 | Hendricks et al. | |
| 6,582,304 B2 | 6/2003 | Walker et al. | |
| 6,598,024 B1 | 7/2003 | Walker et al. | |
| 6,754,641 B2 | 6/2004 | Kolis | |
| 7,272,569 B1 | 9/2007 | Walker et al. | |
| 2003/0037041 A1 | 2/2003 | Hertz | |
| 2003/0130904 A1 | 7/2003 | Katz et al. | |
| 2004/0054593 A1 | 3/2004 | Van Luchene | |
| 2005/0261973 A1 | 11/2005 | Van Luchene | |

FOREIGN PATENT DOCUMENTS

| | | |
|---|---|---|
| EP | 0 109 189 A1 | 5/1984 |
| EP | 0 512 413 A3 | 11/1992 |
| EP | 512 413 A2 | 11/1992 |
| EP | 512413 A | 11/1992 |
| EP | 0 780 788 A2 | 6/1997 |
| FR | 2 736 177 | 1/1997 |
| FR | 95 07963 | 3/1997 |
| FR | 2 757 656 A1 | 6/1998 |
| GB | 1 391 060 | 4/1975 |
| JP | 57086974 | 5/1982 |
| JP | 357086974 | 5/1982 |
| JP | 600251498 | 12/1985 |
| JP | 1211170 | 8/1989 |
| JP | 2171891 | 7/1990 |
| JP | 21979980 | 8/1990 |
| JP | 2278399 | 11/1990 |
| JP | Hei 2 289000 | 11/1990 |
| JP | 040960900 | 2/1992 |
| JP | 4095198 | 3/1992 |
| JP | 4260914 | 9/1992 |
| JP | 04314189 | 11/1992 |
| JP | 5242363 A | 9/1993 |
| JP | 5252363 A | 9/1993 |
| JP | 07-231309 | 8/1995 |
| JP | 8147545 | 6/1996 |
| JP | 8329350 | 12/1996 |
| JP | 09300730 A | 11/1997 |
| JP | 10031792 | 2/1998 |
| JP | 11-505343 | 5/1999 |
| WO | WO 91/03789 | 3/1991 |
| WO | WO 96/34358 | 10/1996 |
| WO | WO 96/36926 | 11/1996 |
| WO | WO 97/28510 | 8/1997 |
| WO | WO 97/35441 | 9/1997 |
| WO | WO 97/46961 | 12/1997 |
| WO | WO 97/50064 | 12/1997 |
| WO | WO 98/43149 | 10/1998 |
| WO | WO 99/11006 | 3/1999 |
| WO | WO 99/19809 | 4/1999 |
| WO | WO 99/46706 | 9/1999 |

OTHER PUBLICATIONS

Andreoli et al., "Cash Machines Offer a Whole Lotto Money for Withdrawal . . . ", Crain's Chicago Business, Jun. 19, 1995, News Section at p. 8, 2pp.

"Major Appliances: Tappan Unveils Microwave Oven Featuring Preprogrammed Controls", HFD, Sep. 10, 1984, p. 103, 1pg.

Herman, Ken, "Auchan Cashes in on Lottery", Houston Post, Jul. 1, 1992, Section A, p. 15, col. 5, 2pp.

The Economist, "Heads I Win, Tails You Lose, M. Rossides' Application of Fair Gambling to Grocery Check-Outs", Business; p. 74, Jun. 13, 1992, 2pp.

"Georgia Almanac", Georgia Almanac, Jan. 26, 1983, BC Cycle, Section: Regional News, 2pp.

Herman, Ken, "Lottery's Losers: Small Stores; Big Pots Bring Big Problems", Austin American-Statesman, Nov. 23, 1996, Section: News, 4pp.

Kelsey, John and Schneier, Bruce, "Conditional Purchase Orders", Fourth AMC Conference on Computer Communication Security, AMC Press, Apr. 1997, 8pp.

Prochaska-Cue, Kathy, "Acquiring Credit", (http://ianr.www.unl.edu/IANR/PUBS/NEBFACTS/NF91.2.htm), download date: Sep. 3, 1997, 4 pp.

Website: "Welcome to OnSale", (http://onsale.com), download date: Sep. 8, 1997, 15 pp.

Website: "IAO—Onsale—GSCI—Zauction—Cyberswap—Auction World", (http://www.iao.auction.com/about.htm), download date: Sep. 8, 1997, 10 pp.

Kirk, Jim, "Digital Promotions Make a Quick Point—McDonald's Testing New Technology on Its Menus", Chicago Tribune, Dec. 26, 1997, 2 pp.

"From Our Family to Yours . . . 5 Weeks of Coupon Values for a Valuable Customer", Wakefern Food Corporation, 1998, 1 pg.

Brochure: "It's in The Bag. Introducing the Universal Holding Cabinet from Welbilt", Frymaster Corporation, 1998, 5 pp.

"Progressive Introduces Kitchen Display System (KDS) for Restaurants", PR Newswire, Jan. 23, 1998, Section: Financial News, 2 pp.

Blair, Adam, "JICC Coupon Guide Recommends Upgrades at Front End", Supermarket News, Feb. 9, 1998, Section: p. 23, ISSN: 0039-5803, 2 pp.

Livingston, Kimball, "In-Store Systems, VideOcart Redux", Retail Tech Magazine, Mar. 1998, pp. 29-30, 2 pp.

Website: "Advanced Mechanics Internet Specials", (http://metroplexweb.com/advcpn2.htm), download date: Mar. 12, 1998, 4 pp.

Website: "U.P.C. Coupon Code Guidelines Manual", Uniform Code Council, Inc., (http://www.uc-council.org/d31-3.htm), download date: Mar. 12, 1998, 10 pp.

"New Wave Marketing", Promotion Times—An SCA Quarterly Newsletter—First Quarter. Apr. 1998, 2 pp.

Hamstra, Mark, "Segment Study: 'Made-for-You' Maneuvers Signal Shift in QSR Category", Nation's Restaurant News, Apr. 13, 1998, 6 pp.

Fogarty, Rich, "POSitive Input: The McDonald's POS-3 System Newsletter from Olivetti Solutions/OLSY", McDonald's Spring/Summer Edition 1998, 8 pp.

"Universal Holding Cabinet Rollout Program", H&K Dallas, Inc., Winter 1998, 6 pp.

"The Northwest German State Lottery—Your Invitation to Play", (http://www.germanstatelottery.com.invitation.html), download date: May 14, 1999, 2 pp.

"Official Lottery Rules", (http://www.gloeckle.com/dedingungen/main.html), download date: May 14, 1999, 5 pp.

Website: "What Actually is the SKL?", (http://www.gloeckle.com/das_spiel/rechts.html), download date: May 14, 1999, 3 pp.

"Epson Partners With International Lottery & Totalizer Systems; Epson's New Acclaim Program Wins With the Gaming Market", Business Wire, Jun. 7, 1999, 2 pp.

"The Change Game", Georgia State Lottery Ticket—Mega Millions Jackpot, Draw Date Aug. 8, 2002, 1 pg.

"Georgia Lottery Corporation—Change Game", (http://www.Georgialottery.com/changegame.html), download date: Dec. 4, 2002, 1 pg.

Website: "Michigan Lottery", (http://www.Michigan.gov/lottery/0,16077-110-812_21193_21321--00.html), download date: Dec. 4, 2002, 3 pp.

Website: "The Change Game—Turning Loose Change into Lottery Dollars", (http://www.berschgaming.com/about_the_game.htm), download date: Dec. 4, 2002.

"Magazine Subscription Sales Center—Where Buying Subscriptions is Easy!", Customer Service Information, Interactive Magazine Sales, Inc., e-mail: aim@panix.com.

Howland, Jennifer, "National Distribution: Scanning the Future", Folio: The Magazine for Magazine Management, Feb. 1985, Section: vol. 14, p. 69, ISSN: 0046-4333, 11 pp.

Wood, Wally, "Circulation Marketing: Let Your Magazine Do the Selling", Folio: The Magazine for Magazine Management, Jun. 1985, vol. 14, p. 78, ISSN: 0046-4333, 10 pp.

Reese, Diane, "Revitalizing Single-Copy Sales", Folio: The Magazine for Magazine Management, Feb. 1986, vol. 15, p. 84, ISSN: 0046-4333, 14 pp.

Joyce, Walter, "Muscular Merchandising: column", Folio: The Magazine for Magazine Management, Jun. 1986, vol. 15, p. 124, ISSN: 0046-4333, 5 pp.

"Phoenix Papers to Sell Merchandise to Build Awareness", Editor & Publisher, Sep. 17, 1988, vol. 121, Issue 38, p. 23, ISSN: 0013-094X, 2 pp.

Donaton, Scott, "Gift Subscriptions Find Retail Niche", Advertising Age, Jul. 16, 1990, Section: News at p. 37, 2 pp.

Guy, Pat, "A Gift Off the Rack: Mag Subscription", USA Today, Dec. 19, 1990, Section: Money at p. B2, 2 pp.

Jaben, Jan, "Magazine Gift-giving Made Simple at Retail Outlets; Time Inc., Hearst, Meredith Test Subscriber Systems' Method of Selling Gift Subscriptions; News" Feb. 15, 1991, vol. 3, No. 2, p. 15, ISSN: 1043-8688, 3 pp.

Horton, Liz, "Holiday Gift Subs Up, Some Due to Novel Promotions", Folio: The Magazine for Magazine Management, Feb. 1, 1992, Section: vol. 21, No. 2, p. 39, ISSN: 0046-4333, 1 pg.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333, 3 pp.

Manly, Lorne, "A Newsstand for the Electronic Age", Folio: The Magazine for Magazine Management, Sep. 15, 1993, vol. 22, No. 16, p. 17, ISSN: 0046-4333, 3 pp.

Hochwald, Lambeth, "Sub Sources that Break With Tradition", Folio: The Magazine for Magazine Management, May 1, 1994, vol. 23, Issue 8, pp. 46-48, ISSN: 0046-4333, 4 pp.

Love, Barbara, "Selling Subscriptions at Newsstands", Folio: The Magazine for Magazine Management, Jun. 1, 1994, vol. 23, Issue 10, p. 10, ISSN: 0046-4333, 2 pp.

"The Super Subs", Precision Marketing, Oct. 24, 1994, No. 0, vol. 0, p. 23, ISSN: 0957-4913, 5 pp.

Cyr, Diane, "Distribution Woes; Declining Newsstand Circulation; Includes Related Article on Preventing Newsstand Fraud", Folio: The Magazine for Magazine Management, Jan. 1995, vol. 23, No. 19, p. 170, ISSN: 0046-4333, 5 pp.

Love, Barbara, "Folio: Plus Circulation; Techniques for Managing Magazine Circulation", Folio: The Magazine for Magazine Management, Jan. 1995, vol. 23, No. 19, p. 159, ISSN: 0046-4333, 3 pp.

Kelly, Keith J., "Hearst Opens a Cyberspace Newsstand", Advertising Age, Jan. 30, 1995, vol. 66, Issue 5, p. 14, ISSN: 0001-8899, 2 pp.

Schnuer, Jenna, "Overnight Options Add to Distribution Mix; Distribution of "Inside Sports" Magazine", Folio: The Magazine for Magazine Management, Mar. 1, 1995, vol. 24, No. 4, p. 19, ISSN: 0046-4333, 2 pp.

Kelly, Keith J., "Publishers Pine for Cyber-Profits", Time, Inc., Mar. 13, 1995, vol. 66, Issue 11, pp. S-22, ISSN: 0001-8899, 2 pp.

"Hearst Corporation Launches 'The Multimedia Newsstand'", Link-Up, Mar./Apr. 1995, vol. 12, Issue 2, pp. 21 & 36, ISSN: 0739-988X, 3 pp.

Wilson, Steve, "Out of Print—but Not Business; Magazines Move Away From Print in Favor of Electronic Publishing", Folio: The Magazine for Magazine Management, May 1, 1995, vol. 24, No. 8, p. 22, ISSN: 0046-4333, 2 pp.

Hochwald, Lambeth, "Postal Blues: Circulators Cope With the Rate Crunch", Folio: The Magazine for Magazine Management, May 1, 1995, vol. 24, No. 8, p. 54, ISSN: 0046-4333, 3 pp.

"Treton Offers Magazine Promo", AdWeek, May 1, 1995, Section: Newswire, 1 pg.

"Lotto World", MediaWeek, May 8, 1995, vol. 5, No. 19 at p. 16, 1 pg.

Graham, Anne, "Nonmember Subs—or Not? Non-Member Subscriptions to Association Magazines; Includes Tips from Publishers", Folio: The Magazine for Magazine Management, Jun. 1, 1995, vol. 24, No. 10, p. 47, ISSN: 0046-4333, 4 pp.

Miller, Paul, "Magazine Deal Lacks Catalog Appeal; Brief Article", Folio: The Magazine for Magazine Management, Jun. 15, 1995, vol. 24, No. 11, p. 30, ISSN: 0046-4333, 2 pp.

Wilson, Steve, "Directory Assistance: A Buyer's Guide Can Give You a Big Boost in Revenue and Attract New Advertisers and Subscribers", Folio: The Magazine for Magazine Management, Oct. 1, 1995, vol. 24, No. 16, p. 40, ISSN: 0046-4333, 6 pp.

Garratt, David, "What Premium on On-Cover Premiums?", Folio: The Magazine for Magazine Management, Oct. 1, 1995, vol. 24, No. 16, p. 53, ISSN: 0046-4333, 3 pp.

"HFS Incorporates and Hatches Filipacchi Magazines; Announce Launch of Century 21 House & Home Magazine . . .", Business Wire, Nov. 20, 1995, 2 pp.

Hochwald, Lambeth, "Circulation Secrets: Nine Steps to a Successful Circulation Launch Strategy Includes List of Resources", Folio: The Magazine for Magazine Management, Feb. 1, 1996, vol. 25, No. 2, p. 53, ISSN: 0046-4333, 5 pp.

Kerwin, Anne Marie, "Notably at the Newsstand: InStyle, Financial World Push for Greater Single-Copy Sales", Inside Media, Feb. 7, 1996, vol. 8, No. 3, p. 26, ISSN: 1046-5316, 2 pp.

Adams, Mark, "Capell Reports Sales Drop at Newsstands", Mediaweek, Mar. 11, 1996, vol. 6, No. 11, p. 27, ISSN: 1055-176X, Coden:Madeap, 1 pg.

Hodges, Jane, "WWJ Puts Squeeze on Web Subscriptions", Advertising Age, Apr. 29, 1996, vol. 67, Issue 18, p. 34, ISSN: 0001-8899, 2 pp.

Schnuer, Jenna, "A World Without Magazines? Consumers Weigh In. Survey of Consumers Indicates That . . . ", Folio: The Magazine for Magazine Management, Jun. 1, 1996, vol. 25, No. 9, p. 16, ISSN: 0046-4333, 2 pp.

Tedesco, Richard, "Time Launches 'Net Subscription Service'", Broadcasting & Cable, Nov. 11, 1996, vol. 126, Issue 47, p. 65, ISSN: 1068-6827, 2 pp.

Case, Tony, "The Electronic Newsstand Branches Out", Folio: The Magazine for Magazine Management, Apr. 1, 1997, vol. 26, Issue 5, p. 13, ISSN: 0046-4333, 2 pp.

Krol, Carol, "Magazine Site to Focus on Commerce", Advertising Age, Aug. 18, 1997, vol. 68, Issue 33, p. 18, ISSN: 0001-8899, 2 pp.

Reilly, Brian, "Upselling' Strategies Hit the Net", Advertising Age's Business Marketing, Chicago, Dec. 1996, 1 pg.

Forman, Preston P., "Vendors Practice What They Preach", Computer Reseller News, Manhasset, Mar. 2, 1998, 3 pp.

Wingfield, Nick, "Priceline to Launch Online 'Yard Sales'", WSJ Interactive Edition (http://www.zdnet.com/filters/printerfriendly/0,6061,2413811-200.htm), 2 pp.

PCT International Search Report for Application No. PCT/US98/05787, dated Apr. 27, 1999, 2 pp.

Goodstein, Ronald C., "UPC Scanner Pricing Systems: Are They Accurate?", Journal of Marketing, Apr. 1994, vol. 58, No. 2, pp. 20-30, ISSN: 0022-2429, 11 pp.

Stankevich, Debby Garbato, "Cook's Warehouse Sets Heavy-Gauge Nonstick", HFN, The Weekly Newspaper for the Home Furnishing Network, Aug. 14, 1995, Section: vol. 69, No. 33, p. 46, 1 pg.

Rodwin, Marc A., "Consumer Protection and Managed Care: The Need for Organized Consumers", Health Affairs, Fall 1996, vol. 15, No. 3, pp. 110-123, ISSN: 0278-2715, CODEN:FRVPBN, 14 pp.

Kennedy, Doug, "Train Front Desk Staff in Sales; Hotel Industry", Hotel & Motel Management, Mar. 3, 1997, Section: No. 4, vol. 212, p. 15, ISSN: 0018-6082, 2 pp.

PCT International Search Report for International Application No. PCT/US98/17287, dated Apr. 16, 1999.

Webster's II, New Riverside University Dictionary, 1994, Houghton-Mifflin Company, pp. 450.

Now Abandoned U.S. Appl. No. 09/083,689, entitled "Method and System for Selling Supplemental Products at a Point-Of-Sale", filed May 21, 1998 in the name of Andrew S. Van Luchene, 50 pp.

Pending U.S. Appl. No. 09/107,971, entitled, "Method and Apparatus for Facilitating the Play of Fractional Lottery Tickets Utilizing Point-of-Sale Terminals", filed Jun. 30, 1998, in the name of Andrew S. Van Luchene, 47 pp.

Lang, Joan, "Round n' Round They Go", May 1, 1996, Restaurant Business, vol. 96, No. 7, pp. 132-134, 2 pp.

Wyatt, Craig, "Usage Models Just for Merchants", Credit Card Management, vol. 8, No. 6, pp. 32-38, Sep. 1995.

Written Opinion for Application No. PCT/U98/05787, dated Jul. 29, 1999, 11 pp.

PCT International Search Report for Application No. PCT/US01/09045, dated Oct. 10, 2001, 5 pp.

Office Action for U.S. Appl. No. 08/920,116 dated Oct. 1, 1999, 8 pp.

Office Action for U.S. Appl. No. 08/920,116, dated Oct. 25, 1999, 14 pp.

Office Action for U.S. Appl. No. 09/442,754, dated Aug. 2, 2000, 9 pp.

Office Action for U.S. Appl. No. 09/442,754 dated Jan. 16, 2001, 11 pp.

Office Action for U.S. Appl. No. 09/442,754, dated Aug. 1, 2001, 6 pp.

Notice of Allowability for U.S. Appl. No. 09/442,754, dated Dec. 7, 2001, 4pp.

Office Action for U.S. Appl. No. 09/442,754, dated Jan. 7, 2003, 7 pp.

Supplemental Allowance for U.S. Appl. No. 09/442,754, dated Mar. 4, 2003, 5 pp.

Office Action for U.S. Appl. No. 10/625,089 dated Apr. 5, 2006, 7 pp.

Office Action for U.S. Appl. No. 10/625,089, dated Sep. 10, 2007, 11 pp.

Office Action for U.S. Appl. No. 09/045,386 dated Aug. 15, 2000, 12 pp.

Office Action for U.S. Appl. No. 09/045,386, dated Mar. 14, 2001, 13 pp.

Office Action for U.S. Appl. No. 09/045,386, dated Oct. 11, 2001, 5 pp.

Office Action for U.S. Appl. No. 09/045,386, dated Jan. 25, 2002, 3 pp.

Office Action for U.S. Appl. No. 09/045,386, dated Jul. 1, 2002, 6 pp.

Office Action for U.S. Appl. No. 09/045,386, dated Mar. 7, 2003, 7 pp.

Office Action for U.S. Appl. No. 09/045,386, dated Nov. 23, 2004, 6 pp.

Supplemental Notice of Allowability for U.S. Appl. No. 09/045,386 dated Mar. 20, 2006, 3 pp.

Office Action for U.S. Appl. No. 09/045,347, dated May 6, 1999, 6 pp.

Office Action for U.S. Appl. No. 09/045,347, dated Jan. 11, 2000, 7 pp.

Office Action for U.S. Appl. No. 09/045,347, dated Sep. 22, 2000, 8 pp.

Office Action for U.S. Appl. No. 09/045,347, dated Apr. 10, 2001, 2 pp.

Office Action (Restriction) for U.S. Appl. No. 09/933,588 dated Aug. 28, 2006, 7 pp.

Office Action for U.S. Appl. No. 09/933,588, dated Aug. 21, 2001, dated Jan. 3, 2007, 10 pp.

Office Action for U.S. Appl. No. 09/083,689 dated Jun. 23, 1999, 11 pp.

Office Action for U.S. Appl. No. 09/083,689, dated Jan. 31, 2000, 2 pp.

Office Action for U.S. Appl. No. 09/083,689, dated Aug. 2, 2000, 19 pp.

Office Action for U.S. Appl. No. 09/083,689, dated Jan. 16, 2001, 9 pp.

Office Action for U.S. Appl. No. 09/083,689, dated Jul. 25, 2001, 9 pp.

Office Action for U.S. Appl. No. 09/083,689, dated Mar. 18, 2002, 14 pp.

Office Action for U.S. Appl. No. 09/045,518, dated Jun. 6, 2000, 9 pp.

Interview Summary for U.S. Appl. No. 09/045,518, dated Nov. 14, 2000, 2 pp.

Office Action for U.S. Appl. No. 09/045,518, dated Feb. 13, 2001, 14 pp.

Examiner's Affidavit for U.S. Appl. No. 09/045,518, dated Feb. 22, 2001, 2 pp.

Office Action for U.S. Appl. No. 09/045,518, dated Jul. 2, 2001, 12 pp.

Office Action for U.S. Appl. No. 09/045,518, dated Feb. 12, 2002, 2 pp.

Office Action for U.S. Appl. No. 09/045,518, dated Apr. 5, 2002, 16 pp.

Office Action for U.S. Appl. No. 09/045,518, dated Jun. 13, 2003, 19 pp.

Decision on Appeal for U.S. Appl. No. 09/045,518, dated May 6, 2004, 63 pp.

Interview Summary for U.S. Appl. No. 09/045,518, dated Jan. 31, 2005, 7 pp.

Notice of Allowability for U.S. Appl. No. 09/045,518, dated Feb. 3, 2005, 6pp.

Office Action for U.S. Appl. No. 11/160,499, dated Mar. 15, 2006, 6 pp.

Office Action for U.S. Appl. No. 11/160,499, dated Nov. 30, 2006, 3pp.

Office Action for U.S. Appl. No. 09/076,409, dated Apr. 13, 1999, 6 pp.

Office Action for U.S. Appl. No. 09/076,409, dated Jan. 5, 2000, 6 pp.

Notice of Allowability for U.S. Appl. No. 09/076,409, dated Mar. 27, 2001, 6 pp.

Office Action for U.S. Appl. No. 09/643,668, dated Dec. 23, 2002, 12 pp.

Notice of Allowability for U.S. Appl. No. 09/643,688, dated Aug. 9, 2004, 4 pp.

Office Action for U.S. Appl. No. 11/099,287, dated Jul. 12, 2006, 7 pp.

Office Action for U.S. Appl. No. 11/099,287, dated Apr. 6, 2007, 10 pp.

Office Action for U.S. Appl. No. 09/045,084, dated Apr. 3, 2000, 10 pp.

Notice of Allowability for U.S. Appl. No. 09/045,084, dated Nov. 6, 2000, 4 pp.

Office Action for U.S. Appl. No. 09/777,297, dated Jul. 8, 2004, 6 pp.

Office Action for U.S. Appl. No. 09/083,483 dated Feb. 22, 2000, 8 pp.

Office Action for U.S. Appl. No. 09/083,483, dated Nov. 22, 2000, 7 pp.

Interview Summary for U.S. Appl. No. 09/083,483, Jan. 29, 2001, 5 pp.

Interview Summary for U.S. Appl. No. 09/083,483, Feb. 9, 2001, 2 pp.

Notice of Allowability for U.S. Appl. No. 09/083,483, 3 pp.

Office Action for U.S. Appl. No. 09/858,458, dated Jan. 26, 2005, 21 pp.

Office Action for U.S. Appl. No. 09/858,458, dated Jun. 29, 2005, 9 pp.

Office Action for U.S. Appl. No. 09/858,458, dated Mar. 24, 2006, 10 pp.

Interview Summary for U.S. Appl. No. 09/858,458, dated Aug. 9, 2006, 3 pp.
Office Action for U.S. Appl. No. 09/045,036, dated Dec. 11, 2007, 9 pp.
Anonymous, Point-of-sale: cash-back feature at the point of sale emerges as new trend in EFT industry. Apr. 18, 1988, 1 pg.
POS spectrum: California bets on POS to spur its lottery sales POS News, Aug. 1990, vol. 7, Issue 3, 1 pg.
"Sharing the winnings", Boston Globe, Apr. 2, 1995, 1 pg.
Downing, Neil, "Money Line: IF 12 people share a winning ticket, they'll have to share a single check", Providence Journal—Bulletin, Oct. 17, 1995, 3 pp.
Notice of Allowance for U.S. Appl. No. 09/442,754 mailed Jan. 7, 2003, 7 pp.
Notice of Allowance for U.S. Appl. No. 10/625,089 mailed Apr. 2, 2008, 9 pp.
Office Action for U.S. Appl. No. 10/625,089 mailed Oct. 24, 2005, 7 pp.
Office Action for U.S. Appl. No. 09/045,036 dated Dec. 11, 2007, 9 pp.
Decision on Appeal for U.S. Appl. No. 09/045,036 mailed Nov. 30, 2005, 14 pp.
Examiner's Answer for U.S. Appl. No. 09/045,036 mailed Sep. 15, 2003, 46 pp.
Office Action for U.S. Appl. No. 09/045,036 mailed Jun. 25, 2002, 27 pp.
Office Action for U.S. Appl. No. 09/045,036 mailed Sep. 27, 2001, 18 pp.
Office Action for U.S. Appl. No. 10/642,978 mailed Aug. 1, 2006, 20 pp.
Office Action for U.S. Appl. No. 10/642,978 mailed Feb. 21, 2006, 10 pp.
Office Action for U.S. Appl. No. 10/642,978 mailed Jun. 28, 2005, 8 pp.
Office Action for U.S. Appl. No. 09/107,971 mailed Jul. 10, 2002, 30 pp.
Office Action for U.S. Appl. No. 09/107,791 mailed Feb. 2, 2004, 28 pp.
Office Action for U.S. Appl. No. 11/456,271 mailed Dec. 31, 2007, 10 pp.
Office Action for U.S. Appl. No. 09/390,430 mailed Jun. 18, 2003, 17 pp.
Office Action for U.S. Appl. No. 09/390,430 mailed Sep. 23, 2002, 17 pp.
International Search Report for PCT/US2000/21318 mailed Nov. 22, 2000, 3 pp.
Notice of Allowance and Issue Fee Due for U.S. Appl. No. 08/822,709 mailed Jan. 16, 2001, 3 pp.
Office Action for U.S. Appl. No. 08/822,709 mailed Feb. 17, 2000, 6 pp.
Office Action for U.S. Appl. No. 08/822,709 mailed Jun. 23, 1999, 5 pp.
Notice of Allowance for U.S. Appl. No. 09/836,409 mailed Jan. 13, 2003, 4 pp.
Office Action for U.S. Appl. No. 09/836,409 mailed Nov. 20, 2002, 4 pp.
Notice of Allowance for U.S. Appl. No. 09/836,409 mailed Sep. 25, 2002, 4 pp.
Notice of Allowance for U.S. Appl. No. 09/836,409 mailed May 16, 2002, 4 pp.
Office Action for U.S. Appl. No. 09/836,409 mailed Oct. 1, 2001, 6 pp.
Notice of Allowance for U.S. Appl. No. 10/424,362, mailed Nov. 11, 2004, 7 pp.
Office Action for U.S. Appl. No. 10/424,362 mailed Jun. 9, 2004, 6 pp.
Office Action for U.S. Appl. No. 10/424,362 mailed Nov. 19, 2003, 11 pp.
Notice of Acceptance for Canadian Application No. 2,284,662 dated Oct. 3, 2003, 1 pg.
Office Action for Canadian Application No. 2,284,662 mailed Jan. 29, 2003, 3 pp.
Office Action for European Application No. 98 013 082 mailed Jul. 24, 2006, 5 pp.
Translation of Office Action for Japanese Application No. 545921/98, mailed Feb. 18, 2003, 4 pp.
Translation of Office Action for Japanese Application No. 545921/98, mailed Jun. 13, 2006, 8 pp.
Translation of Office Action for Japanese Application No. 2005-230017, mailed Nov. 9, 2007, 1 pg.
Notice of Allowance for U.S. Appl. No. 09/045,386 dated May 23, 2007, 7 pp.
Notice of Allowance for U.S. Appl. No. 09/045,386 dated Jan. 10, 2006, 7 pp.
Supplemental Notice of Allowability for U.S. Appl. No. 09/045,386, dated Mar. 20, 2006, 3 pp.
Notice of Allowability and Fees Due for U.S. Appl. No. 09/045,518, mailed Aug. 30, 2005, 7 pp.
Office Action for U.S. Appl. No. 11/160,499 dated Nov. 15, 2007, 9 pp.
Notice of Allowability for U.S. Appl. No. 10/678,058, dated Oct. 1, 2007, 8 pp.
Office Action for U.S. Appl. No. 11/099,287, dated Jan. 10, 2008, 9 pp.
Office Action for U.S. Appl. No. 09/045,084, dated Sep. 1, 1999, 6 pp.
Notice of Allowance for U.S. Appl. No. 09/858,458, dated Oct. 31, 2006, 11 pp.
Interview Summary for U.S. Appl. No. 09/858,458 mailed Aug. 14, 2006, 3 pp.
Notice of Allowability for U.S. Appl. No. 09/083,483, dated Aug. 10, 2006, 6 pp.
Office Action for U.S. Appl. No. 11/099,287 dated Apr. 6, 2007, 10 pp.
Office Action for U.S. Appl. No. 11/099,287 dated Jul. 12, 2006, 7 pp.
International Search Report for Application No. PCT/US98/17287 dated Apr. 16, 1999, 2 pp.
Written Opinion for Application No. PCT/US98/17287 dated Sep. 13, 1999, 5 pp.
International Preliminary Examination Report for PCT/US98/17287 dated Dec. 20, 1999, 5 pp.
International Search Report for PCT/US98/16985, mailed Apr. 12, 2002, 7 pp.
Office Action for Application No. PCT/US98/17274 dated Sep. 30, 2002, 2 pp.
Office Action for Application No. 200-508047 dated Apr. 2, 2002, 8 pp.
Office Action for Application No. 2299341 dated Dec. 17, 2001, 2 pp.
Office Action for Application No. 2299341 dated Feb. 3, 2004, 7 pp.
International Search Report for Application No. PCT/US98/17274 dated Apr. 12, 1999, 4 pp.
Written Opinion for Application No. PCT/US98/17274 dated Feb. 23, 2000, 7 pp.
International Preliminary Examination Report for PCT/US98/17274 dated Jun. 22, 2000, 8 pp.
International Search Report for PCT/US01/09045 dated Oct. 23, 2001, 8 pp.
International Preliminary Examination Report for PCT/US01/09045 dated Sep. 18, 2002, 3 pp.
Office Action for U.S. Appl. No. 11/425,211, dated Mar. 26, 2008, 5 pp.
Office Action for U.S. Appl. No. 11/425,228, dated May 12, 2008, 7 pp.
Office Action for U.S. Appl. No. 11/425,228, dated Jul. 25, 2007, 6 pp.
Office Action for U.S. Appl. No. 11/425,232, dated Mar. 18, 2008, 6 pp.
Office Action for U.S. Appl. No. 09/107,971, dated Oct. 21, 2003, 25 pp.
Office Action for U.S. Appl. No. 09/107,971, dated Oct. 3, 2001, 25 pp.
Office Action for U.S. Appl. No. 11/456,276, dated Dec. 31, 2007, 10 pp.
Office Action for U.S. Appl. No. 10/457,101, dated Dec. 11, 2007, 4 pp.

Notice of Allowance for U.S. Appl. No. 10/457,101, dated Nov. 7, 2007, 4 pp.
Office Action for U.S. Appl. No. 10/457,101 dated May 25, 2007, 13 pp.
Office Action for U.S. Appl. No. 10/457,101 dated Oct. 20, 2006, 12 pp.
Notice of Allowance for U.S. Appl. No. 11/058,653 dated Jun. 4, 2008 7 pp.
Office Action for U.S. Appl. No. 11/058,653 dated May 15, 2007, 5 pp.
Office Action for U.S. Appl. No. 11/456,271 mailed May 29, 2009. 11 pp.
Office Action for U.S. Appl. No. 09/107,971 mailed Oct. 28, 2008, 11 pp.
Notice of Allowance for U.S. Appl. No. 09/045,036 mailed Jul. 23, 2009, 6 pp.
Notice of Allowance for U.S. Appl. No. 09/045,036 mailed Jul. 23, 2009, 7 pp.
Office Action for U.S. Appl. No. 11/099,287 mailed Jul. 6, 2009, 23 pp.
Office Action for U.S. Appl. No. 11/099,287 mailed Oct. 28, 2008, 19 pp.
Notice of Allowance for U.S. Appl. No. 11/425,228 mailed Oct. 8, 2008, 7 pp.
Office Action for U.S. Appl. No. 11/773,274 mailed Aug. 12, 2010, 13 pp.
Office Action for U.S. Appl. No. 11/927,932 mailed Oct. 12, 2011, 25 pp.
Office Action for U.S. Appl. No. 11/927,932 mailed Mar. 31, 2011, 8 pp.
Notice of Allowance for U.S. Appl. No. 11/621,422 mailed Apr. 1, 2010, 10 pp.
Notice of Allowance for U.S. Appl. No. 11/621,422 mailed Dec. 28, 2009, 10 pp.
Office Action for U.S. Appl. No. 10/678,056 mailed Oct. 30, 2007, 6 pp.
Notice of Allowance for U.S. Appl. No. 11/425,211 mailed Feb. 9, 2009, 8 pp.
Office Action for U.S. Appl. No. 11/456,271 mailed Aug. 19, 2008, 8 pp.
Office Action for U.S. Appl. No. 11/456,276 mailed Jan. 13, 2010, 13 pp.
Office Action for U.S. Appl. No. 11/456,276 mailed May 28, 2009, 9 pp.
Office Action for U.S. Appl. No. 10/643,803 mailed Jun. 12, 2008, 9 pp.
Office Action for U.S. Appl. No. 09/603,677 mailed Oct. 3, 2008, 5 pp.
Office Action for U.S. Appl. No. 09/603,677 mailed Dec. 14, 2004, 23 pp.
Office Action for U.S. Appl. No. 09/603,677 mailed Aug. 11, 2004, 31 pp.
Office Action for U.S. Appl. No. 09/603,677 mailed Dec. 12, 2003, 39 pp.
Office Action for U.S. Appl. No. 09/603,677 mailed Mar. 11, 2003, 8 pp.
Brochure, "Introducing the Digital MenuBoard", Siren Technologies, Inc., (www sirentech com), 4 pp.
Rehayem, Gilbert, "Opinion: X-Press Betting", Information Systems & Technology, Ontario Lottery Corp., 1 pg.
"Save the mark", Financial Times (London), Feb. 1, 1983, Section I, Men & Matters, 1 pg.
"Let's Play the Cash Register Receipts Lottery", The New York Times, Dec. 25, 1990, 1 pg.
Jones, Jeanne, "Data Readers Streamline Management; Scanner Technology Aids Retailers as Well as Plants, Wholesalers", The Houston Post, Jun. 26, 1994, 4 pp.
Andreoli, Tom et al., "Cash Machines Offer a Whole Lotto Money for Withdrawl . . .", Crain's Chicago Business, Jun. 19, 1995, 2 pp.
Hadley, Kimberly, "Pastors praying anti-arson effort will burn bias", The Nashville Banner, Jul. 26, 1996, 1 pg.

"Avco Financial Services", National Home Furnishing Association, (http //www homefurnish comNHFA/avco htm), download date: May 23, 1997, 2 pp.
Website, "Catalina Marketing Corporation", (http //catalinamktg com/prodcdir htm), download date: May 29, 1997, 16 pp.
Riordan, Teresa, "Patents; A novel approach to making a better spermicide harks back to some old-fashioned methods", The New York Times, Jun. 9, 1997, 3 pp.
Nairn, Geoff, "The key to your identity: Falling costs will allow fingerprint verification to be widely used, reports Geoff Nairn", Financial Times (London), Jul. 15, 1997, Section: Technology; 3 pp.
"The United Computer Exchange, How It All Works", (http //www uce com/howitworks html), download date: Jul. 23, 199, 6 pp.
"Classified 2000: The Internet Classifieds", Classifieds2000, Inc., (http //www classifieds2000 com/cgi-cls/Display exe?C2K+aboutus), download date: Aug. 6, 1997, 3 pp.
"General trading information and terms provided by tradingfloor. com", (http //www tradingfloor com/info htm), download date: Aug. 14, 1997, 11 pp.
"NASDAQ", Information Sheet, (http //home axford com/corfin/ corf11 htm), download date: Aug. 15, 1997, 3 pp.
Brochure, "For the Crew & the Customer: The Best Drive-Thru & Grill Service", Olivetti North America, Winter 1998, 2 pp.
PCT International Search Report for Application No. PCT/US01/ 09045, dated Oct. 10, 2001, 8 pp.
"Winn-Dixie/ The Salvation Army Report Contributions for War Against Hunger." PR Newswire, Section: Financial News Jun. 10, 1993, 1 pg.
Glickman, Jeff, 10 infomercial facts you need to know (The Infomercial—Special Sourcebook Issue), Adweek Eastern Edition, Mar. 8, 1993, 5 pp.
Brochure, "Reaching Out in New Directions", First Data Corp, 33 pp.
"Cape Town", Reuters Ltd, Nov. 8, 1979, PM Cycle, 1 pg.
Cook, Louise, "ConsumerWatch: Clip, Snip, Save", The Associated Press, Mar. 12, 1984, 2 pp.
Greene, Jan, "Farm bills please assns; National Grocers Association", Supermarket News, Dec. 23, 1985, 1 pg.
"POS spectrum: a lottery looks to POS for growth", UMI, Inc., POS News, Jan. 1989, 1 pg.
Kuttner, Robert, "Computers May Turn the World Into One Big Commodities Pit", Business Week, Sep. 11, 1989, 2 pp.
Schrage, Michael, "An Experiment in Economic Theory; Labs Testing Real Markets", The Record, Nov. 26, 1989, 3 pp.
Del Rosso, Laura, "Marketel says it plans to launch air fare 'auction' in June; Marketel International Inc.", Travel Weekly, Apr. 29, 1991, 3 pp.
"Philips offers customers financing through Citicorp; Philips Medical Systems North America, Citicorp North America Inc." Health Industry Today, Jun. 1991, 1 pg.
Pelline, Jeff, "Travelers Bidding On Airline Tickets SF firm offers chance for cut-rate fares" The San Francisco Chronicle, Aug. 19, 1991, 2 pp.
Del Rosso, Laura, "Ticket-bidding firm closes its doors; Marketel International; Brief Article", Travel Weekly, Mar. 12, 1992, 2 pp.
"Coupons get serious; supermarkets use barcodes to prevent misredemptions", Chain Store Age Executive with Shopping Center Age, Oct. 1992, 2 pp.
Fiorini, Phillip, "'No Place for Penny?'/Smallest coin doesn't make cents to some", USA Today, Jul. 29, 1994, 3 pp.
Smith, Alison, "Survey of UK Consumer Credit and Asset Finance", Financial Times, Nov. 3, 1994, 3 pp.
"Spain: BBV launches new card", Cards International, Jun. 22, 1995, 2 pp.
Knippenberg, Jim, "Will local radio empires strike back?", The Cincinnati Enquirer, Jul. 23, 1995, 1 pg.
Brochure, "Cyber Bid", Net Fun Ltd., Copyright 1996, 9 pp.
McKinney, Jeff, "Merchant program could pay off for Provident", The Cincinnati Enquirer, Mar. 24, 1996, 2 pp.
Gapper, John, "NatWest reports rise in bad debt", Financial Times, Jul. 31, 1996, 1 pg.
"Lynx Technology: Lynx to provide business leasing programme through Schroder Leasing", 2 pp.

Taylor, Paul, "Towards a dream market", Financial Times (London), Sep. 4, 1996, 2 pp.

Fickenscher, Lisa, "Amex to Start Free Rewards Program with Discounts on Merchandise", The American Banker, Oct. 18, 1996, 2 pp.

Fitzgerald, Kate, "Amex Program Moves Loyalty to Next Level: Custom Extras Finds a Medium Customers Can't Ignore: Billing Statements", Advertising Age, Nov. 4, 1996, 2 pp.

Bonnici, Joseph et al., "Consumer issues in coupon usage: An exploratory analysis", Journal of Applied Business Research, Winter 1996/1997, Section: vol. 13, No. 1, 11 pp.

Singletary, Michelle, "Electronic World, Unchecked Problem? U.S. Move to Paperless Payments Raises Worries About Those Who Don't Use Banks", The Washington Post, Mar. 4, 1997, 4 pp.

Fickenscher, Lisa, "Merchant: American Express Seeks to Mine Its Data on Cardholder Spending Patterns", The American Banker, Mar. 24, 1997, 2 pp.

"Industry Briefs", Card News, Jun. 9, 1997, 2 pp.

Davis, Charles, "Dispensing the future", Electronic Payments International, May 1997, Section: Feature, 5 pp.

Hoeschen, Brad, "Brookfield Square hopes mall card strikes a chord", Business Journal—Milwaukee, Sep. 12, 1997, 2 pp.

Website, "NCR 7452 Workstation", (http //www ncr com/products/retail/products/catalogs/7452 shtm), download date: Sep. 23, 1997, 3 pp.

Brochure, "NCR 7453 PC-Based Point-of-Sale Solution", NCR Corporation, Copyright 1998, 2 pp.

PCT International Search Report for Application No. PCT/US98/05787, dated May 12, 1999, 2 pp.

PCT Written Opinion for Application No. PCT/US98/05787, dated Jul. 29, 1999, 12 pp.

Silverman, Gene, "Planning and using infomercial campaigns effectively.", Direct Marketing, Sep. 1995, vol. 58, No. 5, 4 pp.

Raab, David M., "Package Aids Catalog Management", DM News, Apr. 22, 1996, Section: Software Review, 2 pp.

"Bigger Plans (Provident Bank, issuer of MeritValue customer loyalty card, plans to offer program in 25 cities in six months", Card Fax, Oct. 7, 1996, 1 pg.

Quittner, Jeremy, "Ohio's Provident brings its discount card to Fla.", American Banker, Feb. 11, 1997, vol. 162, Issue 28, 2 pp.

Symons, Allene, "Lucky, Sav-on Debut Rewards Card.", Drug Store News, Feb. 17, 1997, 2 pp.

McKeveny, Alexander, "Giving them a good reason.", Bank Marketing, Mar. 1997, vol. 29, Issue 3, p. 37, 5 pp.

Office Action for U.S. Appl. No. 08/920,116 mailed Oct. 7, 1999, 7 pp.

Notice of Allowability for U.S. Appl. No. 08/920,116 mailed Oct. 28, 1999, 6 pp.

Office Action for U.S. Appl. No. 09/442,754 mailed Jan. 16, 2001, 9 pp.

Office Action for U.S. Appl. No. 09/442,754 mailed Aug. 1, 2000, 11 pp.

Notice of Allowability for U.S. Appl. No. 09/442,754 mailed Dec. 14, 2001, 4 pp.

Office Action for U.S. Appl. No. 09/442,754 mailed Aug. 1, 2001, 6 pp.

Notice of Allowability for U.S. Appl. No. 09/442,754 mailed Oct. 1, 2002, 6 pp.

Supplemental Allowance for U.S. Appl. No. 09/442,754 mailed Mar. 7, 2003, 5 pp.

Office Action for U.S. Appl. No. 10/625,089 mailed Sep. 10, 2007, 11 pp.

Office Action for U.S. Appl. No. 10/625,089 mailed Apr. 5, 2006, 7 pp.

Affidavit of James W. Myrhe, dated Feb. 22, 2001, 1 pg.

Notice of Allowance for U.S. Appl. No. 12/365,629 mailed Nov. 23, 2011, 6 pp.

Office Action for U.S. Appl. No. 12/365,629 mailed Jul. 28, 2011, 7 pp.

Office Action for U.S. Appl. No. 11/160,499 mailed Dec. 5, 2008, 9 pp.

550

| TRANSACTION IDENTIFIER: T-41-1730918 ||
|---|---|
| GROUP: MEAL 2 ||
| PRODUCT CATEGORY <u>552</u> | ITEM ORDERED <u>554</u> |
| SANDWICH | CHEESEBURGER |
| SANDWICH | CHEESEBURGER |
| SIDE ORDER | LARGE FRIES |
| BEVERAGE | *MISSING ITEM* |
| DESSERT | *MISSING ITEM* |

| TRANSACTION IDENTIFIER: T-41-1730918 | | |
|---|---|---|
| SUBTOTAL: $9.50 | | |
| ROUND-UP AMOUNT: $0.50 | | |
| ITEM | PRODUCT CATEGORY | COST |
| COOKIES | DESSERT | $0.23 |
| APPLE PIE | DESSERT | $0.13 |
| ICE CREAM CONE | DESSERT | $0.21 |
| SMALL MILK SHAKE | DESSERT | $0.37 |
| JUICE | BEVERAGE | $0.36 |
| SMALL SOFT DRINK | BEVERAGE | $0.08 |
| MEDIUM SOFT DRINK | BEVERAGE | $0.11 |
| HAMBURGER | SANDWICH | $0.37 |
| CHEESEBURGER | SANDWICH | $0.45 |

| REPLACE ITEM RULES | | |
|---|---|---|
| ITEM ORDERED 702 | REPLACEMENT ITEM 704 | REPLACEMENT COST 706 |
| HAMBURGER | CHEESEBURGER | $0.11 |
| HAMBURGER | QUARTER POUND HAMBURGER | $0.23 |
| HAMBURGER | DOUBLE-DECKER BURGER | $0.31 |
| CHEESEBURGER | QUARTER POUND HAMBURGER | $0.18 |
| CHEESEBURGER | DOUBLE-DECKER BURGER | $0.25 |
| 8 PIECE CHICKEN NUGGET | 12 PIECE CHICKEN NUGGET | $0.22 |
| MEDIUM FRIES | LARGE FRIES | $0.30 |
| SMALL SOFT DRINK | MEDIUM SOFT DRINK | $0.21 |
| SMALL SOFT DRINK | LARGE SOFT DRINK | $0.27 |

FIG. 12

| TRANSACTION IDENTIFIER:T-41-1730918 |||
|---|---|---|
| ITEM ORDERED | REPLACEMENT ITEM | REPLACEMENT COST |
| CHEESEBURGER | QUARTER POUND HAMBURGER | $0.18 |
| CHEESEBURGER | DOUBLE-DECKER BURGER | $0.25 |
| MEDIUM FRIES | LARGE FRIES | $0.30 |

| PROFIT SCORING SUB-PROCESS | | | | | | | 830 |
|---|---|---|---|---|---|---|---|
| WEIGHT: 4 | | | | | | | |
| TRANSACTION IDENTIFIER: T-41-173-0918 | | | | | | | |
| SUBTOTAL: $9.50 | | | | | | | 812 |
| OFFER AMOUNT: $0.50 | | | | | | | 810 |
| ADDITIONAL ITEM | | | | | | | |
| ADDITIONAL ITEM 802 | PRODUCT CATEGORY 804 | ITEM COST 814 | ITEM PROFIT 818 | RELATIVE PROFIT PERCENTAGE 822 | PROFIT BASED SCORE 826 | WEIGHTED SCORE 832 | |
| COOKIES | DESSERT | $0.23 | $0.27 | 16.67 | 16.67 | 66.67 | |
| ICE CREAM CONE | DESSERT | $0.31 | $0.19 | 11.73 | 11.73 | 46.91 | |
| MEDIUM SOFT DRINK | BEVERAGE | $0.11 | $0.39 | 24.07 | 24.07 | 96.30 | |
| REPLACE ITEM | | | | | | | |
| ORDERED ITEM 806 | REPLACE ITEM 808 | REPLACEMENT COST 816 | ITEM PROFIT 820 | RELATIVE PROFIT PERCENTAGE 824 | PROFIT BASED SCORE 828 | WEIGHTED SCORE 834 | |
| CHEESEBURGER | QUARTER POUND HAMBURGER | $0.18 | $0.32 | 19.75 | 19.75 | 79.01 | |
| CHEESEBURGER | DOUBLE-DECKER BURGER | $0.25 | $0.25 | 15.43 | 15.34 | 61.73 | |
| MEDIUM FRIES | LARGE FRIES | $0.30 | $0.20 | 12.35 | 12.35 | 49.38 | |

| POPULARITY SCORING SUB-PROCESS | | | | | |
|---|---|---|---|---|---|
| WEIGHT: 3 | | | | | 830 |
| TRANSACTION IDENTIFIER: T-41-1730918 | | | | | |
| SUBTOTAL: $9.50 | | | | | 812 |
| OFFER AMOUNT: $0.50 | | | | | 810 |
| ADDITIONAL ITEM | | | | | |
| ADDITIONAL ITEM 802 | PRODUCT CATEGORY 804 | TAKE RATE (%) 852 | RELATIVE POPULARITY PERCENTAGE 856 | POPULARITY BASED SCORE 860 | WEIGHTED SCORE 864 |
| COOKIES | DESSERT | 15 | 15.79 | 15.79 | 47.37 |
| ICE CREAM CONE | DESSERT | 6 | 6.32 | 6.32 | 18.95 |
| MEDIUM SOFT DRINK | BEVERAGE | 21 | 22.11 | 22.11 | 66.33 |
| REPLACE ITEM | | | | | |
| ORDERED ITEM 806 | REPLACE ITEM 808 | TAKE RATE (%) 854 | RELATIVE POPULARITY PERCENTAGE 858 | POPULARITY BASED SCORE 862 | WEIGHTED SCORE 868 |
| CHEESEBURGER | QUARTER POUND HAMBURGER | 12 | 12.63 | 12.63 | 37.89 |
| CHEESEBURGER | DOUBLE-DECKER BURGER | 9 | 9.47 | 9.47 | 28.42 |
| MEDIUM FRIES | LARGE FRIES | 32 | 33.68 | 33.68 | 101.05 |

850

DISCOUNT SCORING SUB-PROCESS

WEIGHT: 3

TRANSACTION IDENTIFIER: T-41-1730918

SUBTOTAL: $9.50

OFFER AMOUNT: $0.50

ADDITIONAL ITEM

| ADDITIONAL ITEM 802 | PRODUCT CATEGORY 804 | RETAIL PRICE 902 | DISCOUNT 906 | RELATIVE DISCOUNT PERCENTAGE 910 | DISCOUNT BASED SCORE 914 | WEIGHTED SCORE 918 |
|---|---|---|---|---|---|---|
| COOKIES | DESSERT | $0.85 | $0.35 | 13.46 | 13.46 | 26.92 |
| ICE CREAM CONE | DESSERT | $1.10 | $0.60 | 23.08 | 23.08 | 46.16 |
| MEDIUM SOFT DRINK | BEVERAGE | $1.20 | $0.70 | 26.92 | 26.92 | 53.85 |

REPLACE ITEM

| ORDERED ITEM 806 | REPLACE ITEM 808 | RETAIL PRICE DIFFERENCE 904 | DISCOUNT 908 | RELATIVE DISCOUNT PERCENTAGE 912 | DISCOUNT BASED SCORE 916 | WEIGHTED SCORE 920 |
|---|---|---|---|---|---|---|
| CHEESEBURGER | QUARTER POUND HAMBURGER | $0.75 | $0.25 | 9.62 | 9.62 | 19.23 |
| CHEESEBURGER | DOUBLE-DECKER BURGER | $1.00 | $0.50 | 19.23 | 19.23 | 38.46 |
| MEDIUM FRIES | LARGE FRIES | $0.70 | $0.20 | 7.69 | 7.69 | 15.38 |

FIG. 16

| CUMULATIVE SCORING SUB-PROCESS | | | | |
|---|---|---|---|---|
| TRANSACTION IDENTIFIER: T-41-1730918 | | | | |
| SUBTOTAL: $9.50 812 | | | | |
| OFFER AMOUNT: $0.50 810 | | | | |
| ADDITIONAL ITEM | | | | |
| ADDITIONAL ITEM 802 | PROFIT SCORE 952 | POPULARITY SCORE 956 | DISCOUNT SCORE 960 | CUMULATIVE SCORE 964 |
| COOKIES | 66.67 | 47.37 | 26.92 | 140.96 |
| ICE CREAM CONE | 46.91 | 18.95 | 46.16 | 112.02 |
| MEDIUM SOFT DRINK | 96.30 | 66.33 | 53.85 | 216.48 |
| REPLACE ITEM | | | | |
| ORDERED ITEM 806 | PROFIT SCORE 954 | POPULARITY SCORE 958 | DISCOUNT SCORE 962 | CUMULATIVE SCORE 966 |
| QUARTER POUND HAMBURGER | 79.01 | 37.89 | 19.23 | 136.13 |
| DOUBLE-DECKER BURGER | 61.73 | 28.42 | 38.46 | 128.61 |
| LARGE FRIES | 49.38 | 101.05 | 15.38 | 165.81 |

FIG. 17

| PRODUCT/ SERVICE IDENTIFIER 1300 | PRODUCT/ SERVICE NAME/ DESCRIPTION 1302 | CATEGORY 1304 | PRICE 1306 | COST 1308 |
|---|---|---|---|---|
| P-0984-90234 | HAMBURGER | SANDWICH | $1.10 | $0.40 |
| P-0283-17234 | CHEESEBURGER | SANDWICH | $1.35 | $0.45 |
| P-1230-89127 | DOUBLE-DECKER BURGER | SPECIALTY SANDWICH | $2.35 | $0.65 |
| P-8902-29037 | LARGE FRIES | SIDE ORDER | $1.85 | $0.37 |
| P-0902-09823 | MEDIUM FRIES | SIDE ORDER | $1.15 | $0.21 |
| P-5678-12345 | LARGE ONION RINGS | SIDE ORDER | $2.15 | $0.48 |
| P-7654-09876 | SMALL SOFT DRINK | BEVERAGE | $1.15 | $0.08 |
| P-0123-99887 | LARGE SOFT DRINK | BEVERAGE | $1.45 | $0.36 |

FIG. 19

| USER IDENTIFIER 1350 | USER NAME 1352 | USER CONTACT INFORMATION 1354 | PAYMENT IDENTIFIER 1356 |
|---|---|---|---|
| C-12-12-123434 | TOM HENRY | 203-555-5555 | CREDIT CARD 1239-0912-0128-0928 |
| C-49-12-437952 | SUE JONES | SJONES @ACME.COM | DEBIT CARD 9032-0934-0293-0938 |
| C-47-83-971234 | BINGO LONGFELLOW | 333 GAME STREET CARDVILLE, ND | FREQUENT SHOPPER CARD TKWSJ-9763214 |
| C-92-46-982734 | CHARLES TRUMAN | CT@CTHOME.ORG | CHARGE ACCOUNT 7671-198365102 |
| C-09-23-178345 | JEFF BLEDSO | 555-555-5555 | BANK ACCOUNT 098218923902 3845 |
| C-03-04-196337 | MARK SIMPSON | NONE | NONE |
| C-05-12-100194 | SARAH JACKSON | JACKSON DESIGNS ACMETOWN, OHIO | CORPORATE ACCOUNT SIMD-219-6437 |

FIG. 20

| TRANSACTION IDENTIFIER 1400 | DATE/TIME 1402 | USER IDENTIFIER 1404 | PRODUCT/ SERVICE 1406 |
|---|---|---|---|
| T-1-9348275 | 1/16/00 5:35 PM | C-12-12-123434 | P-0984-90234-02 |
| T-2-8973462 | 1/16/00 9:20 PM | C-92-46-982734 | P-1230-89127-12 |
| T-3-9087234 | 1/20/00 4:28 PM | C-92-46-982734 | P-0928-09823-58 |
| T-4-9087234 | 2/11/00 10:20 AM | C-05-12-100194 | P-1230-89127-12<br>P-1492-12010-71 |
| T-5-9087234 | 2/12/00 7:30 AM | C-03-04-196337 | P-1519-72193-02<br>P-1492-12010-71 |

FIG. 21

METHOD AND APPARATUS FOR SELECTING A SUPPLEMENTAL PRODUCT TO OFFER FOR SALE DURING A TRANSACTION

CROSS-REFERENCE TO RELATED APPLICATIONS

This application is a continuation of U.S. patent application Ser. No. 12/365,629 entitled METHOD AND APPARATUS FOR SELECTING A SUPPLEMENTAL PRODUCT TO OFFER FOR SALE DURING A TRANSACTION, filed Feb. 4, 2009 and issued as U.S. Pat. No. 8,103,520 on Jan. 24, 2012; which is a continuation of U.S. patent application Ser. No. 09/603,677 filed Jun. 26, 2000, and issued as U.S. Pat. No. 7,542,919 on Jun. 2, 2009.

U.S. patent application Ser. No. 09/603,677 claims priority to U.S. Provisional Patent Application No. 60/190,818 entitled METHOD AND SYSTEM FOR PROCESSING SUPPLEMENTARY PRODUCT SALES, filed Mar. 21, 2000.

U.S. patent application Ser. No. 09/603,677 also is a continuation-in-part of U.S. patent application Ser. No. 08/920,116 entitled METHOD AND SYSTEM FOR PROCESSING SUPPLEMENTARY PRODUCT SALES AT A POINT-OF-SALE TERMINAL, filed Aug. 26, 1997 and issued as U.S. Pat. No. 6,119,099 on Sep. 12, 2000, which is a continuation-in-part of U.S. patent application Ser. No. 08/822,709 entitled SYSTEM AND METHOD FOR PERFORMING LOTTERY TICKET TRANSACTIONS UTILIZING POINT-OF-SALE TERMINALS, filed Mar. 21, 1997 and issued as U.S. Pat. No. 6,267,670 on Jul. 31, 2001.

Each of the above-referenced applications is incorporated by reference herein in its entirety.

BACKGROUND OF THE INVENTION

1. Field of the Invention

This invention relates generally to a method and apparatus for conducting a transaction and, more particularly, to a method and apparatus for selecting one or more supplemental products or services to offer for sale to a customer during a transaction.

2. Description of the Prior Art

Most stores or merchants that are visited by customers have one or more point-of-sale terminals, such as cash registers. Store cashiers and check out clerks often use point-of-sale terminals for calculating the total price of a purchase for one or more products and/or services and the amount of change due to a customer. Some point-of-sale terminals track purchases made and adjust a database of stored inventory accordingly.

In many situations, a merchant may desire to offer to sell a customer or user a product or service in addition to the product(s) and/or service(s) being purchased by the customer or as a replacement for one of the product(s) and/or service(s) being purchased by the customer while the customer is shopping at the merchant or shopping on-line via a merchant's World Wide Web site. Some prior art transaction systems exist. For example, U.S. Pat. No. 6,055,513 issued to Katz et al. discloses a method and apparatus for effecting commercial transactions at remote locations over communications networks and for selecting and offering an upsell transaction.

Unfortunately, despite the state of the art in point-of-sale and on-line transaction systems, there remains a need for a customer independent method and apparatus for conducting transactions for products and services and for determining a supplemental product or service to offer a customer during a transaction, either in addition to the products and/or services the customer is purchasing or as a replacement to one or more of the products and/or services that the customer is purchasing. The supplemental product selected may be based on the products or services that the customer is currently purchasing.

SUMMARY OF THE INVENTION

Accordingly, it is an object of the present invention to provide a method and apparatus for conducting transactions for products and services and to provide a method and apparatus for selecting a supplemental product or service to offer a user during a transaction, either in addition to the products and/or services the user is purchasing or as a replacement to one or more of the products and/or services that the user is purchasing.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for conducting a transaction includes receiving information for a transaction, determining a pool of at least one supplemental product, scoring at least one supplemental product in the pool, selecting a supplemental product from the pool for the transaction, and providing an indication of the supplemental product selected from the pool. The supplemental product may be an additional supplemental product or a replacement supplemental product. In some embodiments, selecting the supplemental product may include selecting at least one supplemental product from the pool based on the scores. The scoring of supplemental products may use a profit based scoring approach, a popularity based scored approach, a discount scoring approach, or some other scoring approach. Selection of a supplemental product may also be based on other criteria, such as the preparation time for products, the amount or number of one or more products in inventory, marketing and/or consumer research information, or a "collaborative filter" which incorporates one or more of the other approaches.

Also to achieve the foregoing and other objects and in accordance with the purposes of the present invention, as embodied and broadly described herein, an apparatus for conducting a transaction includes a memory, a communication port, and a processor connected to the memory and the communication port, the processor being operative to receive information for a transaction, determine a pool of at least of supplemental product, score at least one supplemental product in the pool, select at least one supplemental product from the pool for the transaction, and provide an indication of the at least one supplemental product selected from the pool.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIG. 9 is a tabular representation of a possible data structure for a record illustrating product groups and complementary product categories for the food products illustrated in FIG. 6;

FIG. 11 is a tabular representation of a possible data structure for a record illustrating possible additional supplemental products and associated costs for the food products illustrated in FIG. 6;

FIG. 12 is table illustrating possible replacement supplemental products and associated replacement costs for food products in the example illustrated in FIG. 6;

FIG. 13 is a table illustrating possible replacement supplemental products and associated replacement costs for the food products illustrated in FIG. 6;

FIG. 14 is a tabular representation of a possible data structure for a record illustrating the use of profit based scoring for the determine scores for products in poll step of FIG. 3;

FIG. 15 is a tabular representation of a possible data structure for a record illustrating the use of popularity based scoring for the determine scores for products in poll step of FIG. 3;

FIG. 16 is a tabular representation of a possible data structure for a record illustrating the use of discount based scoring for the determine scores for products in poll step of FIG. 3;

FIG. 17 is a tabular representation of a possible data structure for a record illustrating the use of profit based, popularity based, and discount based scoring for the determine scores for products in poll step of FIG. 3;

FIG. 19 is a tabular representation of a possible data structure for the product database of FIG. 18;

FIG. 20 is a tabular representation of a possible data structure for the user database of FIG. 18;

FIG. 21 is a tabular representation of a possible data structure for the transaction database of FIG. 18.

DETAILED DESCRIPTION OF THE EMBODIMENTS

Figure 1:
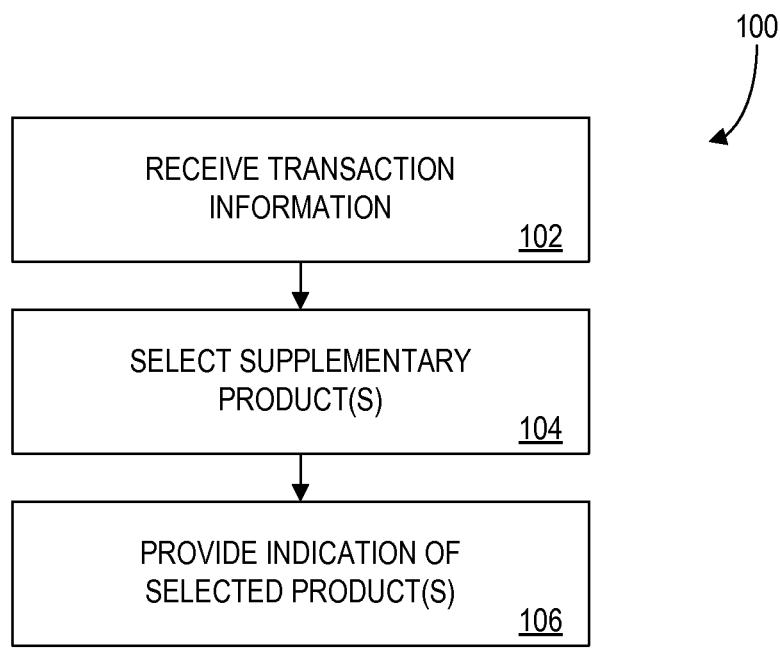
FIG. 1 is a flowchart of a first embodiment of a method in accordance with the present invention.

A first embodiment 100 of a method in accordance with the principles of the present invention is illustrated in FIG. 1. The method 100 allows a user or other customer, controller, point-of-sale terminal, etc. to conduct a transaction for the purchase of one or more products and/or services, during which a supplemental product or service is offered for sale to a user during a transaction, the supplemental product being either in addition to the products and/or services the user is purchasing or as a replacement to one or more of the products and/or services that the user is purchasing. The method 100 may be implemented in a retail embodiment where a user is purchasing products and/or services at a cash register or other point-of-sale terminal. The method 100 may also be implemented in an online embodiment where a user is purchasing products and/or services using a computer, terminal, telephone or other client or user device and accessing a World Wide Web site, online catalog, interactive voice response unit or system, etc.

The method 100 illustrated in FIG. 1 includes a step 102 during which transaction information is received by a controller, point-of-sale terminal, user device, or other device, regarding a user's purchase or attempted purchase of one or more products and/or services. For purposes of simplicity of explanation and claiming of the present invention, as used herein, the term "product" will be used to refer to any of a tangible item, good, product, a service, a coupon offer, a lottery ticket or fractional lottery ticket, etc. The method 100 also includes a step 104 during which a selection is made, either by a controller, point-of-sale terminal, user device, etc. of one or more supplemental products to offer for sale to the user. The supplemental product(s) may be in addition to the product(s) being purchased by the user or in replacement of one or more products being purchased by the user. During a step 106, an indication or message of the supplemental product selection made during the step 104 is provided or indicated to a user, user device, controller, point-of-sale terminal, or other device. The indication or message provided during the step 106 may also include information regarding the price of the supplemental product chosen during the step 104, the amount of time a user or customer has to indicate a willingness to purchase the supplemental product chosen during the step 104, the amount of time a user or customer has to indicate or provide a payment identifier (e.g., a credit card, a frequent shopper card, smart card, etc.) to purchase the supplemental product chosen during the step 104, where and how the supplemental product chosen during the step 104 may be obtained or received, descriptive information of the supplemental product chosen during the step 104, etc. The method 100 and the steps 102, 104, 106 will be discussed in additional detail below.

In some embodiments of the method 100, the price to a user for a supplemental product may be based in whole or in part on an amount of change due a customer during a transaction. The amount of change due a customer during a transaction is the difference between a purchase price for the product(s) being purchased by the customer and an amount tendered by the customer. Customers typically tender whole number cash amounts in the form of bills of paper money, while purchase prices are most often non-whole number amounts. Accordingly, the amount of change due to a customer at a point-of-sale terminal typically includes one or more coins, which the point-of-sale terminal or cashier dispenses to the customer. In some embodiments, a price for a supplemental product may be based on a portion of the change due to a customer or on a larger rounding amount (e.g., the amount of change needed to make the total customer price for a transaction equal to five dollars, equal to ten dollars, etc.)

A significant advantage of the method 100 for a retailer is that the retailer may be able to entice or convince a customer to purchase an additional or replacement supplemental product, thereby increasing incremental sales made by the retailer. One type of replacement supplemental product is an upgrade supplemental product. For example, a customer buying shoes, pants, and a shirt from a retailer might be convinced to purchase matching socks and ties as additional supplemental products, thereby increasing the sales made by the retailer. Alternatively, the retailer might convince the customer to purchase a different pair of shoes as a replacement supplemental product or a better pair of shoes as an upgrade replacement product.

A retailer using the method 100 may generate additional opportunities to sell products to customers that are perishable, soon to be out of fashion, etc., that might otherwise go unsold or otherwise create a loss for the retailer. Furthermore, the method 100 gives a retailer an ability to sell products for which it has excess inventory, thereby limiting or reducing losses the retailer may incur if the retailer miscalculates demand for a specific product. While the retailer may sell the excess products for a lower price than desired by the retailer, the method 100 allows a retailer to generate good will on behalf of customers. In some situations, the retailer may be willing to sell a product at a reduced price to help motivate the customer to purchase the product. Since the retailer is offering to sell the supplemental product to a customer at a reduced price after the customer has selected products he or she wishes to purchase at normal (i.e., not reduced) prices, the offer will have little, if any, effect on sales of the supplemental product at a normal price.

Another significant advantage of the method 100 for a retailer is that the retailer may increase impulse purchases by a customer while the customer is conducting a transaction, paying for products, standing in a check-out line, etc. Therefore, in addition to displays of candy, magazines, shoe laces, cosmetics, etc. often found at a check out line or near a point-of-sale terminal, the retailer has an additional way to provide opportunities to customers to make impulse purchases.

A significant advantage of the method 100 for a customer is that the customer may receive a benefit by accepting an offer to buy an additional or replacement product. For example, a customer might have an opportunity to purchase a product that is better than (e.g., is more desirable, has a higher retail price, etc.) the product originally selected by the customer. In addition, a customer might have an opportunity to purchase an additional product at a price that is lower the product's normal price, thereby saving the customer money.

Figure 2:
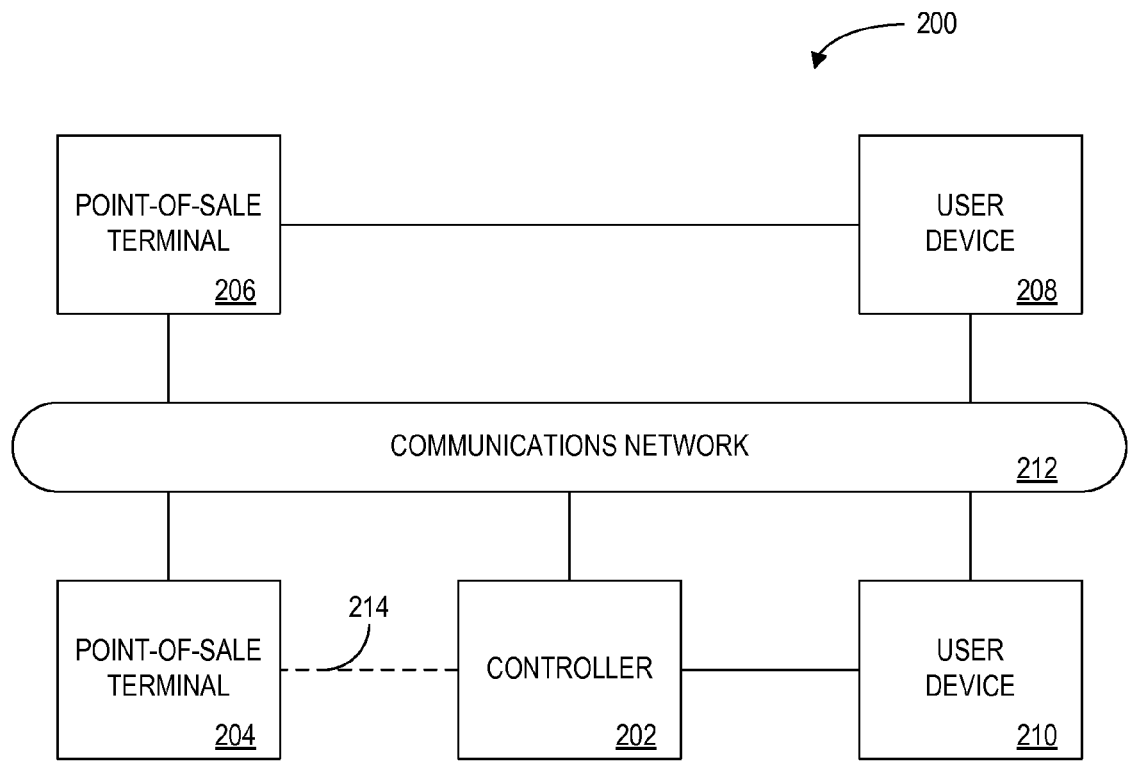
FIG. 2 is a block diagram of system components for an embodiment of an apparatus usable with the method of FIG. 1.

Now referring to FIG. 2, an apparatus or system 200 usable with the method 100 is illustrated. The apparatus 200 includes a controller 202 that may communicate with one or more point-of-sale terminals 204, 206 and user devices 208, 210 either directly or indirectly via a computer, data, or communications network 212. The controller 202 and/or one of the point-of-sale terminals 204, 206 preferably perform the steps 102, 104 and 106 of the method 100 and receive transaction information from users who may be using the user devices 208, 210 or who may be interacting with a store employee operating one of the point-of-sale terminals 204, 206.

The controller 202 may be operated by, for, or on behalf of a single retailer, chain of retailers, collection of retailers, mall, shopping center, one or more manufacturers, one or more suppliers, a government agency, etc. The controller 202 may also function as a World Wide Web site server. The operation, configuration and use of the controller 202 will be discussed in further detail below.

The system 200 may also include one or more point-of-sale terminals, such as the point-of-sale terminals 204, 206. The point-of-sale terminals 204, 206 may be located in, or associated with, retail stores, a mall or shopping center, a retail chain headquarters, etc. and preferably are used to communicate store, product, service, product category, service category, benefit, customer, purchase or transaction related information to the controller 202, the user devices 208, 210 or other devices connected to the communications network 212. For example, a point-of-sale terminal may provide a confirmation or indication to the controller 202 that a customer has purchased a product or service during a transaction.

Point-of-sale terminals may communicate indirectly with the controller 202 and/or the user devices 208, 210 via the communication network 212 or more directly, such as indicated by the dashed line 214 in FIG. 2. The operation, configuration and use of a point-of-sale terminal will be discussed in further detail below.

The user devices 208, 210 preferably allow customers to interact with the controller 202 and the remainder of the apparatus 200. The user devices 208, 210 also enable customers to provide or receive indications of products or services, customer identifiers, payment information, purchase confirmations, indications of benefits, indications of products or services, product information, service information, etc. Additionally, the user devices 208, 210 may enable a user to receive information, instructions, etc. from the controller 202, a point-of-sale terminal, or other device. User devices may be or include a personal computer, portable computer, mobile or fixed user station, workstation, network terminal or server, telephone, cellular telephone, beeper, kiosk, dumb terminal, personal digital assistant, facsimile machine, customer information display associated with a point-of-sale terminal, etc. A single user or customer may operate, use or control one or more user devices and may use different devices and types of user devices for different functions. The operation, configuration and use of user devices will be discussed in further detail below.

The communications network 212 may be the Internet, the World Wide Web, or some other public or private computer or communications network or intranet, as will be described in further detail below. The communications network 212 is only meant to be generally representative of cable, computer or other communication networks for purposes of elaboration and explanation of the present invention and other devices, networks, etc. may be connected to the communications network 212 without departing from the scope of the present invention. The communications network 212 is also intended to be representative of, and include all or a part of, the Internet, the World Wide Web, and other privately or publicly operated networks. The communications network 212 can also include other public and/or private wide area networks, local area networks, data communication networks or connections, intranets, extranets, cable modems, routers, satellite links, microwave links, cellular or radio links, fiber optic transmission lines, ISDN lines, T1 lines, DSL, etc.

Now referring again to FIG. 1, the method 100 and the steps 102, 104 and 106 will be discussed in more detail in relation to the system 200 illustrated in FIG. 2. As previously discussed above, the method 100 includes a step 102 during which transaction information is received from a user, a user or client device, a retailer, a retailer device, etc. relating to the purchase, rental, lease, etc. of one or more products or services. Transaction information received during the step 102 may include the product(s) and/or service(s) involved in the transaction and their quantities, the prices for product(s) and/or service(s) involved in the transaction, a user identifier, a user device identifier, a retailer or store identifier, an employee identifier for an employee involved in the transaction, a point-of-sale terminal identifier for a point-of-sale terminal involved in the transactions, the time and/or date of the transaction, a method of payment or a payment identifier, preference information for a user, credit history of a user, characteristics of a user, user demographic information, information regarding a user's brand, product or service loyalty or preference, information regarding a user's brand product or service indifference, a product identifier, a service identifier, an amount of change due a user as a result of the transaction, product quantity or inventory information, a price for a product being purchased during the transaction, a price for a service being purchased during the transaction, time of day, day of week, holiday, weather, number of people in a party, etc. Some or all of the transaction information received during the step 102 may be stored in a transaction database for later use by the controller 202, a point-of-sale terminal, a user device, etc. An example transaction database will be described in more detail below.

While the transaction information preferably will be received or obtained during the step 102 by the controller 202 or a point-of-sale terminal directly or indirectly from a user or user device, the transaction information may also be received by a retailer, a cashier or check-out clerk, and/or a retailer device or some other device. In addition, the transaction information received during the step 102 may be received via any one or more communication channels, such as via a telephone call, facsimile transmission, email message, data transmission over the communications network 212, etc.

After the transaction information is received during the step 102, one or more supplemental products are determined, identified or otherwise selected during the step 104. The step 104 and offers to sell or otherwise provide supplemental products may occur during any point of a transaction based on the transaction information or other data received at the point of the transaction.

Selection of a supplemental product may be completed by the controller 202, a point-of-sale terminal, a retailer, a retailer device, a cashier or check-out clerk, etc. In general, a supplemental product typically will relate in some way to the product(s) being purchased or otherwise obtained by a user during the transaction for which information is received during the step 102. As will be discussed in more detail below, a supplemental product can be identified or selected in many ways or according to different rules or procedures. In addition, the rules may change during operation of the method 100, as information about users, user preferences, user purchasing history, product inventory levels, product popularity or market acceptance, product costs or profit margins, etc. are received or determined. Thus, a system or entity using the method 100 may adjust or tune itself or the applied rules over time to optimize use and operation of the method 100.

Supplemental products for a transaction may include products in addition to the products being purchased by a user during the transaction or replacement products for one or more of the products being purchased during the transaction. For example, if a group of products being purchased by a user during a transaction at a sporting goods store or World Wide Web site includes a backpack and a sleeping bag, an additional supplemental product for the transaction could be a tent, a hiking stick, hiking boots, a portable cooking stove, etc. A replacement product for the transaction could be a different backpack or a different sleeping bag. In another example, if a group of products being purchased by a user during a transaction at a fast food restaurant includes a hamburger, a small order of French fries, and a medium soft drink, an additional supplemental product might be an ice cream cone or milk shake. A replacement supplemental product for the hamburger might be a cheeseburger, a replacement supplemental product for the small order of French fries might be a large order of French fries, and a replacement product for the medium soft drink might be a large soft drink or a large milk shake.

After one or more supplemental products are determined, identified or otherwise selected during the step 104, one or more indications of one or more of the selected products is provided to a user, user device, point-of-sale terminal, etc. The indication may be provided by the controller 202, a point-of-sale terminal, a retailer, a retailer device, a cashier or check-out clerk, etc. Indications may be provided to multiple places or device at or near the same time, such as to a point-of-sale terminal and a customer device.

An indication may be provided via an email or other data message or transmission, vocal message, visual display, telephone call, facsimile transmission, regular or express mail, radio signal, beeper signal, etc. For example, a user shopping at a retailer might receive the indication personally and audibly from a cashier or check out clerk or visually via a display on a point-of-sale terminal. A user shopping online at a retailer's World Wide Web site via a user device, such as a personal computer, may receive the information in a message from the World Wide Web site. The World Wide Web site may be operating on a controller or other device. If more than one supplemental product is determined during the step 104, each product may be associated with a unique indication. Alternatively, an indication may illustrate that more than one supplemental product has been selected during the step 104. The indication for a supplemental product selected during the step 104 may include a product description, a product identifier, a price, an offer to sell the product for a specific price, a time limit for the offer, a term or condition associated with the purchase of the product, and/or other transaction or supplemental product information.

In embodiments where the indication provided during the step 106 for a transaction includes an offer to sell a selected supplemental product to a user, the method 100 may also include a step wherein an acceptance of the offer to purchase the selected supplemental product is received by the controller 202, a user device, a point-of-sale terminal, a cashier or check-out clerk, etc. If desired, the acceptance may need to be received during a predetermined period of time in order to be valid or effective. In some embodiments, the offer provided in the indication may be assumed to be accepted if no rejection of the offer is received. Furthermore, the rejection may need to be received during a predetermined period of time in order to be valid or effective. In some embodiments, if a response to an offer is negative or if an offer is otherwise declined, an additional or secondary offer may be made.

In some embodiments, more than one supplemental product may be offered for sale or indicated to a user. In such embodiments, the user may be allowed to accept one or more of the offers to purchase a supplemental product. The method 100 may then include providing or transmitting such an offer or indication to the user via the controller 202, a point-of-sale terminal, a user device, etc. and/or receiving a selection or choice from the user as to which offer or offers to accept.

In some embodiments of the method 100, a price or offer amount for the supplemental product(s) selected during the step 104 may also be determined or identified. The price or offer amount for a supplemental product may be the regular full price for the product, a discounted version of the regular full price for the product, or some other amount. In some embodiments, the amount of change due to a user for a given transaction may be the price or offer amount for a supplemental product. While the amount of change may be in cash, the transaction is not limited to cash transactions and the amount of change due may be computed in a cashless transaction (e.g., a credit card transaction).

Receiving and carrying loose change, especially coins, is an annoyance to many users or customers when making a purchase or otherwise conducting a transaction. Consequently, users often are forced to tender non-whole number cash amounts in order to dispose of their unwanted coins and/or reduce the coins that would otherwise be provided to them by a cashier or check-out clerk as change for their purchase. Coins and bills that are tendered by the user are generally collected by a cashier at a point-of-sale terminal.

Both dispensing coins to and collecting coins from a user increases the amount of time a cashier spends processing a purchase or transaction, and therefore increases the amount of time that users wait in line at a point-of-sale terminal. Accordingly, businesses must often pay wages for time spent handling coins, and users must experience delays as coins are exchanged between cashiers and users. In addition, it is possible that the cashier will make a mathematical error and dispense the wrong amount of change to a user. Users often anticipate such an error and count their change to assure that they have received the correct amount. Such users typically count their change before leaving the point-of-sale terminal, further delaying other users from initiating a purchase or transaction. In addition, businesses also often incur costs associated with counting, rolling, banking and otherwise handling coins. By some estimates, businesses expend hundreds of thousands of hours and hundreds of millions of dollars each year just to handle coins. Therefore, both users and businesses may benefit by avoiding the need to provide change to users during a transaction.

In some embodiments, the price or offer amount of a supplemental product may be based on the amount of change due to a user during a transaction. A cashier or check-out device, a point-of-sale terminal, a user device, the controller 202, or some other device may determine the change due to a customer in connection with the user's purchase and price the supplemental product accordingly or use the amount of change due to determine which product to select as a supplemental product.

In some embodiments, the price or offer amount of a supplemental product may be based on a round-up amount. For example, in a transaction for clothing products having a transaction total of $156.75, a round-up amount based on ten dollar levels would be $3.25 (i.e., $160.00–$156.75). If the round-up amount is based on one-hundred dollar increments, a round-up amount for the transaction total of $156.75 would be $43.25 (i.e., $200–$156.75). Use of round-up amounts as offer amounts for supplemental products are particularly applicable in cashless transactions, such as when a user is paying with a credit or debit card. A round-up amount may be larger depending on the total transaction amount (e.g., rounding to the nearest one-hundred dollar amount instead of the nearest ten dollar amount if the transaction total exceeds five hundred dollars).

The operation, use and concept of taking an amount of change due a customer or user and offering to sell a new product or "upsell" to the customer or user in exchange for the amount of change due is discussed in pending U.S. patent application Ser. No. 08/920,116 entitled METHOD AND SYSTEM FOR PROCESSING SUPPLEMENTARY PRODUCT SALES AT A POINT-OF-SALE TERMINAL, the contents of which are incorporated herein by reference.

A price or offer amount for a supplemental product and an offer to sell a supplemental product may be provided or indicated by a point-of-sale terminal. For example, when a user brings a purchase to a point-of-sale terminal, the point-of-sale terminal may generate or otherwise determine the purchase price for the purchase and set a "required payment amount" to be equal to the purchase price. The required payment amount indicates the amount the customer is expected to pay. The point-of-sale terminal then generates or otherwise determines a rounded price for a supplemental product, preferably by rounding up the purchase price to a whole number, and calculates therefrom a round-up amount equal to the difference between the purchase price and the rounded price. Accordingly, a round-up amount for a transaction may indicate or be based on the coins or other amount due as change in a cash transaction, or the nearest and higher ten dollar amount (e.g., a round-up amount for a $163.50 transaction total is $6.50, i.e., $170.00–$163.50) or the nearest and higher hundred dollar amount (e.g., a round-up amount for a $163.50 transaction total is $36.50, i.e., $200–$163.50) in a cashless transaction. As previously discussed above, a round-up amount may be larger depending on the total transaction amount (e.g., rounding to the nearest one-hundred dollar amount instead of the nearest ten dollar amount if the transaction total exceeds one-thousand dollars).

Now referring to FIG. 3, the select supplemental product(s) step 104 of the method 100 illustrated in FIG. 1 will now be discussed in more detail. As previously discussed above, the method 100 includes a step 104 during which one or more supplemental products are identified or otherwise selected. The step 104 may be used to determine either of both of an additional supplemental product or a replacement supplemental product. In some embodiments, the step 104 may include a step 300 during which a pool of one or more possible supplemental products is identified or determined, a step 302 during which the products determined during the step 300 are ranked or scored, and a step 304 during which the supplemental product(s) to be indicated during the step 106 is selected or chosen based, at least in part, on the product ranks or scores computed or determined during the step 302. Each of the steps 300, 302, 304 will be discussed in further detail below.

During the step 300, the pool of potential supplemental products is identified or otherwise determined. In general, the pool of products determined during the step 300 corresponds to the potential products that may be offered as a supplemental product during a given transaction. Preferably, the given transaction is the transaction for which information is received during the step 102. A merchant or retailer may determine potential products in many different ways, such as by querying a database containing information regarding relationships between products, checking product inventory, etc. The pool of potential products determined during the step 300 may vary depending on whether additional supplemental products are being determined or replacement supplemental products are being determined, as will be discussed in more detail below.

During the step 302, the potential supplemental products identified or determined during the step 300 are ranked or scored so that their relative value, use, etc. as supplemental products may be ascertained. The candidate list of supplemental products created during the step 300 may be scored in many different ways, such as by profitability, user popularity, a discount at which they can be offered for sale to a user, a number of the products remaining in inventory, the time to prepare the product for sale or delivery to a user, a products' associated labor costs, the occurrence of sale or other promotion, an occurrence of a holiday, a competitor's sale or promotion, customer preferences, customer purchase history or buying habits, time to prepare the supplemental products for sale, marketing or consumer research or data, etc. As used herein, "scoring" of supplemental products will include and encompass any kind of rating, ordering, measuring, testing, appraising, accessing, evaluating, comparing, contrasting, etc., that may be used to evaluate and choose possible supplemental products for a transaction.

In a profit scoring approach, the cost associated with a possible supplemental product is compared to the costs of other possible supplemental products to determine the profit that would be made if a user accepts an offer to purchase the supplemental product. The potential supplemental products can then be ranked according to which supplemental product provides the most profit if purchased. A more detailed example of the profit scoring approach is provided below.

In a popularity scoring approach, each potential supplemental product is scored based on the percentage of users who have accepted an opportunity in the past to purchase the supplemental product when offered the opportunity by a merchant or retailer. Therefore, the potential supplemental products can be ranked according to which supplemental product is most likely to be purchased by a user if the user is given an opportunity to purchase the supplemental product. Another approach to popularity scoring or measurement may be based on a particular customer's past buying habits in purchasing similar products, accepting supplemental offers for the same or similar products, etc. A popularity scoring approach may also measure users' perceived value for the potential supplemental products. A more detailed example of the popularity scoring approach is provided below.

In a discount scoring approach, each potential supplemental product is scored according to the discount at which the supplemental product may be offered to a user for a given transaction. Thus, such a discount scoring approach is based at least in part on the price or offer amount the supplemental products will be offered for sale to a user, which may vary from one transaction to another. A more detailed example of the discount scoring approach is provided below.

In some embodiments a combination of scoring approaches or techniques might be used for supplemental products. Thus, a cumulative score might be generated by using weighted or non-weighted scores generated by two or more supplemental product scoring approaches. For example, both the profit scoring approach and the popularity scoring approach might be used to generate a single composite or collaborative score. The relative importance or weight of a score generated using the profit scoring approach versus a score generated using the popularity scoring approach in a composite or collaborative score can be varied according to the desired implementation. Thus, a score generated using the profit scoring approach may be weighted such that it constitutes a higher percentage of a final composite score as compared to a score generated using the popularity scoring approach, thereby reflecting the relative importance given to each of the two scoring approaches when determining or selecting a supplemental product.

During the step 304, one or more products from the pool of products identified during the step 300 and scored during the step 302 are selected or chosen as the supplemental product(s). The determination of how many products should be selected as supplemental products may vary according to implementation. For example, only the product having the highest or best score as determined during the step 302 may be selected as a supplemental product during the step 304. Alternatively, the two, three, four, etc. products having the highest or best score as determined during the step 302 may be selected as supplemental products during the step 304. As another example, all of the products having scores exceeding a threshold or meeting some other criteria may be selected as supplemental products during the step 304. In another example, random or semi-random selection among products having the top N scores may also be used to select supplemental products during the step 304.

As previously discussed above, the step 104 may be used to determine either an additional supplemental product or a replacement supplemental product. Therefore, the steps 300, 302, 304 may be used to determine either an additional supplemental product or a replacement supplemental product. However, the step 104 may operate differently if an additional supplemental product is being determined as opposed to a replacement supplemental product. More specifically, the step 300 during which a pool of possible supplemental products is identified or determined may operate differently if the supplemental product is an additional supplemental product as opposed to a replacement supplemental product.

Figure 3:
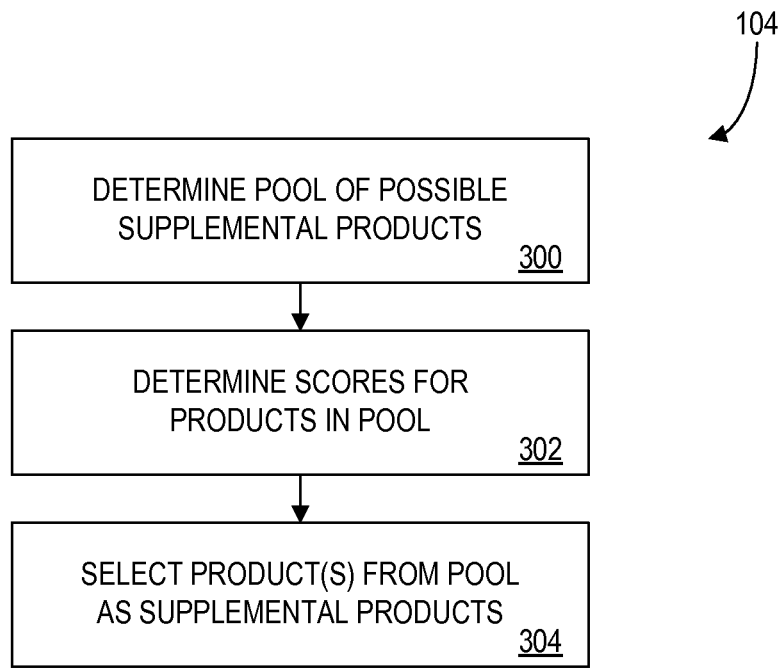
FIG. 3 is a block diagram of the select supplemental product(s) step of the method of FIG. 1.
Figure 4:
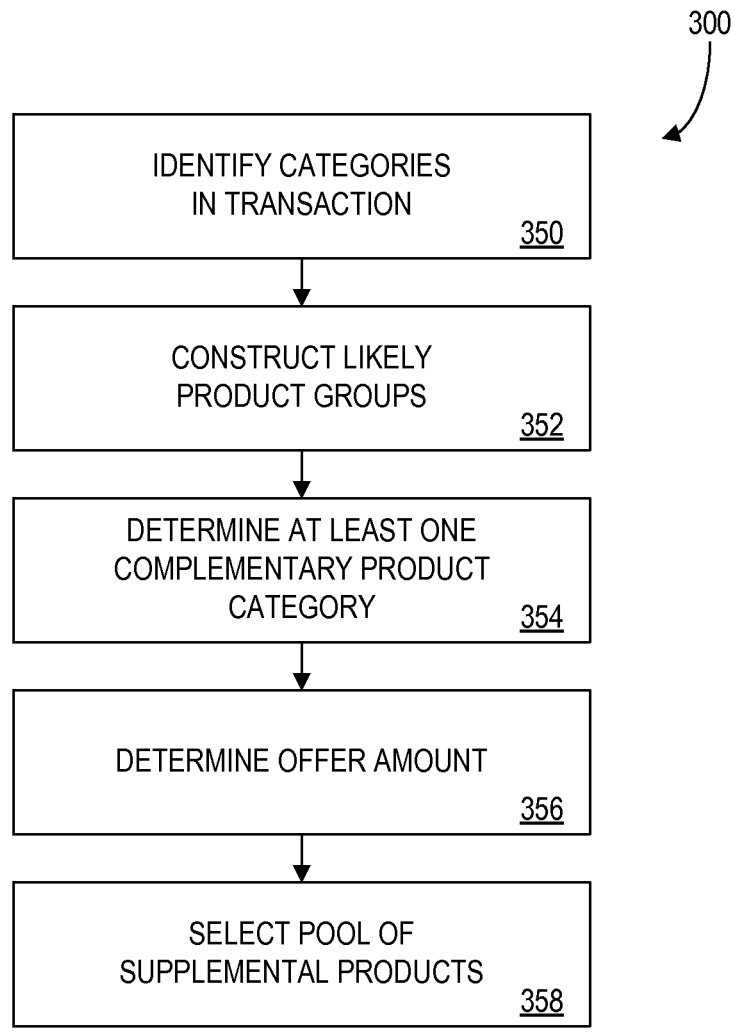
FIG. 4 is a block diagram of the select product from pool step of FIG. 3 usable in embodiments during which a supplemental product is added to the products involved in a transaction.

Now referring to FIG. 4, the step 300 illustrated in FIG. 3 is illustrated for use in embodiments where an additional supplemental product might be selected during the step 300 for the step 104 in the method 100. The step 300 may include a step 350 during which product categories may be determined or identified based on products purchased or ordered by a user. Categorizing of products during the step 350 helps to determine complementary products that would be good choices for supplemental products, as will be described in more detail below. Product category information may be retrieved from a product database. An example product database is discussed in more detail below.

Product categories may be of various levels of specificity. For example, product categories might be broadly defined as "food," "sporting goods," "housewares," "clothing," "automotive products," etc. Alternatively, product categories might be defined more narrowly as "specialty sandwich," "sandwich," "beverage," "side order," "dessert," etc., all of which may be related to products offered for sale by a restaurant. Product categories may also be based on other criteria, such as product cost, type of customer to whom a product is sold, popularity of products, etc. Furthermore, product categories and product groups may be based on any desired or similar characteristics or products.

For a user purchasing two hamburgers, one small order of French fries, one large order of onion rings, one large drink, and one ice cream cone, the product categories identified during the step 350 may include two products in the "sandwich" category (e.g., the two hamburgers), two products in the "side order" category (e.g., the small order of French Fries and the large order of onion rings), one product in the "beverage" category (e.g., the large drink), and one product in the "dessert" category (e.g., the ice cream cone). As a second example, product categories might be as "shirt," "shoes," "pants," "skirt," "blouse," "jacket," "socks," "dress," etc., all of which may be related to products offered for sale by a department store or other retailer. In some embodiments, a number of different categorization schemes might be used and a given product might fall within more than one category (e.g., a product may fall into both a "specialty sandwich" product category and a "sandwich" product category).

During a step 352, likely groups of related products are constructed from the product categories identified during the step 350. For example, in a situation where the categories for a transaction are food related (e.g., "specialty sandwich," "sandwich," "beverage," "side order," "dessert," etc.), a group of products in certain product categories might be considered as a "meal." More specifically, a "meal" may be considered as one product in the "sandwich" category, one product in the "side order" product category, and one product in the "beverage" category. Therefore, for a user who is purchasing two hamburgers, one small order of French fries, one large drink and one small drink, the user is purchasing one "meal," e.g., one hamburger, one small order of French fries, and one small drink. Therefore, the first "meal" comprises a group of product categories determined or identified during the step 352. The remaining hamburger and one large drink are not sufficient to complete a second "meal" as "meal" is defined above.

As another example, in a situation where the categories for a transaction are clothing related (e.g., "shirt," "shoes," "pants," "skirt," "blouse," "jacket," "socks," "dress," etc.), a group of products in certain product categories might be considered as an "outfit." More specifically, an "outfit" may be considered as one product in the "pants" or "skirt" categories and one product in the "shirt" or "blouse" categories. Therefore, a user who is purchasing three pairs of pants, one skirt, one pair of socks, two pairs of shoes, and five shirts is buying four "outfits," three "outfits" comprising a pair of pants and a shirt and one "outfit" comprising a skirt and a shirt. The pairs of socks and shoes and the remaining shirt are not sufficient to complete a second "outfit" as "outfit" is defined above.

During a step 354, at least one complementary product category is chosen for the categories determined during the step 350 and the groups constructed during the step 352. That is, product categories complementary or related to the product categories identified during the step 350 are identified that might complete or augment a group completely or partially constructed during the step 352. For the food example discussed above, the purchase of two hamburgers, one small order of French fries, one large drink and one small drink comprised one "meal." The remaining hamburger and one large drink were not sufficient to complete a second "meal." Therefore, a complimentary product category for this example may be "side order" since the addition of a "side order" product to the hamburger and one large drink would complete a "meal." Another complementary product category for the user may be "dessert" since the user has purchased at least one complete "meal," but no desserts to go along with it. There may be other product categories determined during the step 354 and many different product categories may be available depending on the categories identified during the step 350, the groups constructed during the step 352, etc.

For the clothing example discussed above, a pair of socks or shoes may be supplemental additional products for an "outfit" and, as a result, "socks" and "shoes" are complimentary product categories for a user purchasing an "outfit." Similarly, a jacket, umbrella, purse, or other clothing item may also be supplemental additional products for an "outfit."

During an optional step 356, an offer amount for a supplemental additional product may be determined, selected or identified. An offer amount may be based on a predetermined amount (e.g., five dollars, fifty cents, etc.), on the total price of the products being purchased by a user during a transaction, on a price of one of the products being purchased by a user during a transaction, the amount of change due to a customer during a transaction, on transaction information determined during the step 102, product categories identified during the step 350, product groups constructed during the step 352, etc. The offer amount determined or identified during the step 356 may be different for different transactions, different product categories, different product groups, etc. and may vary with the amount or number of products in inventory, the occurrence of a sale, promotion or holiday, etc. For the food example discussed above, the offer amount may be set or determined to be fifty cents. Alternatively, the offer amount may be equal to an amount of change due to a user during a transaction. Thus, if the price of the two hamburgers, one small order of French fries, one large drink and one small drink is four dollars and forty cents and a user provides a five dollar bill to pay for the food, the amount of change due is sixty cents. If the user provides a ten dollar bill to pay for the food, the amount of change due may be five dollars and fifty cents.

During a step 358, one or more supplemental products are selected or identified which fit or fall into one or more of the complementary product categories identified during the step 354 and which can be provided for the offer amount determined or calculated during the step 356. As will be described in more detail below, more than one product may be selected during the step 358.

Figure 5:
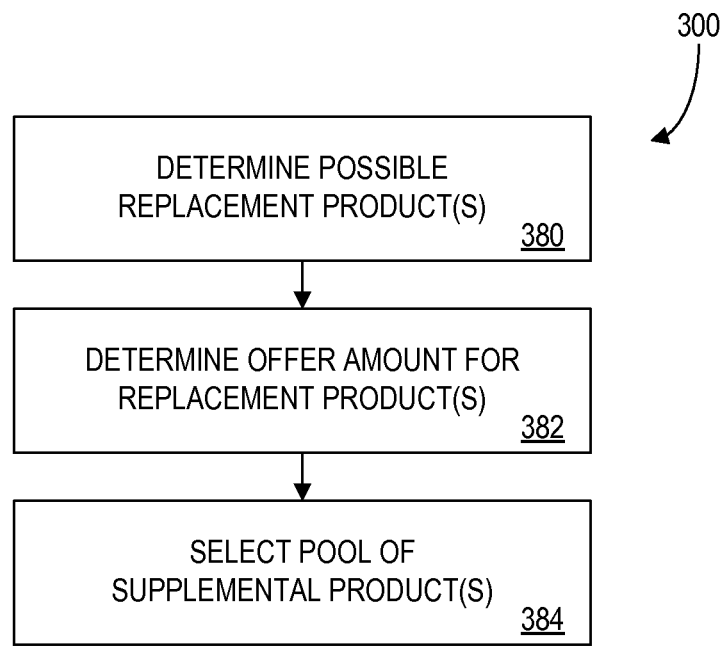
FIG. 5 is a block diagram of the select product from pool step of FIG. 3 usable in embodiments during which a supplemental product replaces a product involved in a transaction.

Now referring to FIG. 5, the step 300 illustrated in FIG. 3 is illustrated for use in embodiments where a replacement supplemental product might be selected during the step 300 for the step 104 in the method 100. The step 300 in this embodiment includes a step 380 during which possible replacement products are determined or identified for the products being purchased during a transaction. In some embodiments, information regarding the products being purchased during the transaction may be included in the transaction information received by the controller 202 or during the step 102 and used to determine possible replacement products. Information regarding possible replacement products for one or all of the products being purchased during the transaction may be stored in a product database populated, maintained and/or accessed by the controller 202, a point-of-sale terminal, a retailer device, a user device, etc. Potential replacement products for a specific user may also be selected during the step 380 based on the user's past purchasing history, known preferences, etc.

In the food examples discussed above, a cheeseburger might be a replacement supplemental product for a hamburger and an order of onion rings might be a replacement supplemental product for an order of French fries. Alternatively, in the good example, a supplemental product offer may be based on knowledge of a person's food preferences. In the clothing example discussed above, a shirt may be a replacement supplemental product for a shirt or blouse being purchased by a user and a skirt may be a replacement supplemental product for a pair of pants being purchased by a user. Alternatively, in the clothing example, a supplemental product offer may be based on knowledge of a person's existing wardrobe.

During a step 382, the offer amounts, prices and/or costs for the potential replacement products determined or identified during the step 380 are determined. The step 382 is similar to the step 356 previously discussed above. In some embodiments, the prices or costs may be determined by accessing or querying a product database. Prices determined during the step 382 may be the prices to be charged to a user for the replacement products identified during the step 380. Costs determined during the step 382 may be the costs for the provider of the replacement products identified during the step 380. In general, the price or offer amount charged to a user for a supplemental replacement product will be higher or greater than the cost to the provider for providing the supplemental replacement product to the user. An offer amount may comprise only a monetary figure or amount, a non-monetary figure or amount (e.g., frequent diner points, frequent flyer miles), a manufacturer or third-party sponsored payment, coupon, etc., or a combination of a monetary figure or amount and a non-monetary figure or amount.

During a step 384, a pool of one or more potential supplemental replacement products identified during the step 380 is chosen or identified. In some embodiments, a potential supplemental replacement product may need to have a higher user price than a product the supplemental replacement product is offered to replace. In other embodiments, a supplemental replacement product may need to have a lower provider cost than a product the supplemental replacement product is offered to replace. In other embodiments a supplemental replacement product may need to have an incremental price increase over the product that it is replacing that is lower than or equal to an amount of change due to a customer or some other fixed amount (e.g., one dollar, $1.50, etc.).

In order to provide a more detailed explanation of one possible implementation of the method 100 and the system 200, two detailed examples of an implementation and use of the method 100 will be now be provided, with reference to FIGS. 7-18. While the following examples are directed to uses of the method 100 and the system 200 by a restaurant or other food provider to sell food products such as hamburgers, cheeseburgers, French fries, etc. to users, the method 100 and the system 200 is not limited to such an implementation. The first example is directed to an implementation of the method 100 to provide an additional supplemental product to a user purchasing food products and the second example is directed to an implementation of the method 100 to provide a replacement supplemental product to a user purchasing food products.

In an implementation of the method 100 wherein one or more additional supplemental products are determined during the step 104, the method 100 proceeds in accordance with the steps illustrated in FIG. 4. As previously discussed above, in this type of implementation, the steps 350, 352, 354, 356, and 358 comprise at least part of the step 300 in the step 104.

Figure 6:
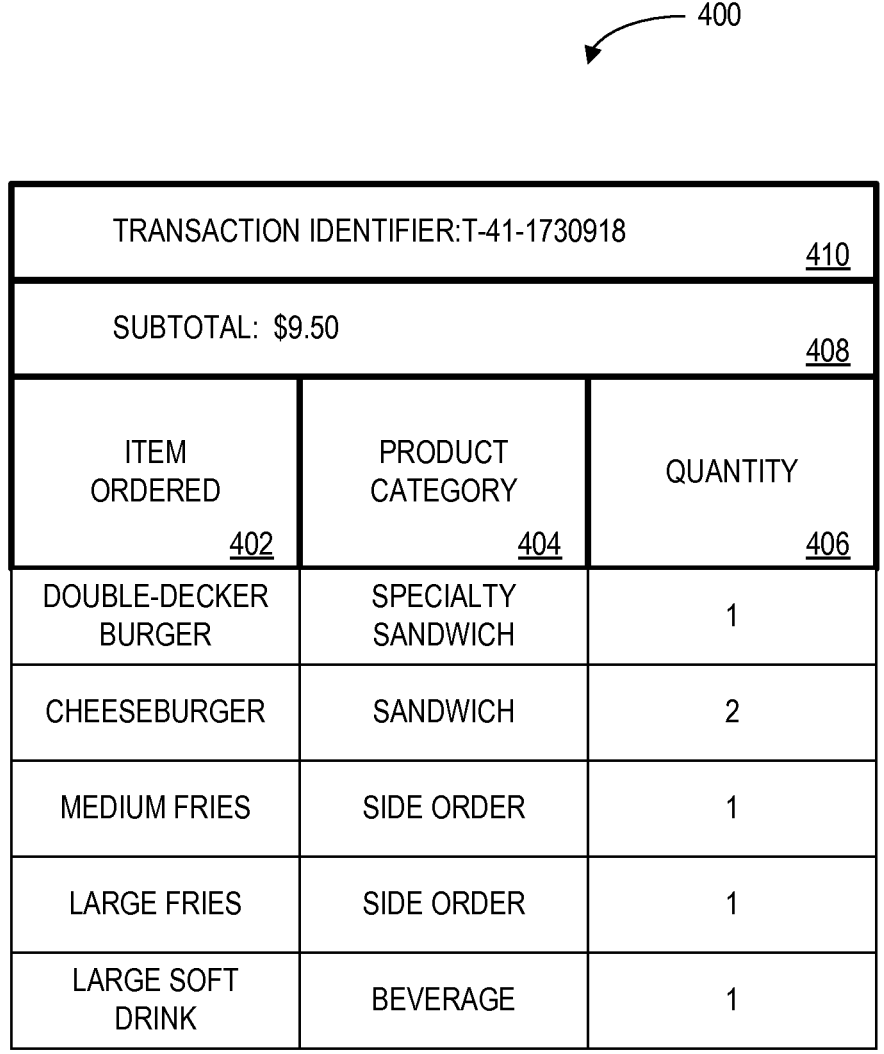
FIG. 6 is a tabular representation of a possible data structure for a record illustrating food products purchased during a transaction using the method of FIGS. 1, 3, and 4.

Now referring to FIG. 6, a record 400 is illustrated that may be generated as transaction information by the controller 202, a point-of-sale terminal or a user device during a transaction during which a user is purchasing one double-decker burger, two cheeseburgers, one medium order of fries, one large order of fries, and one large soft drink, which fall into the product categories "SPECIALTY SANDWICH," "SANDWICH," "SIDE ORDER," and "BEVERAGE," as illustrated in the entries in the fields 402, 404, 406 of the record 400. The record 400 may be generated during a transaction initiated, conducted or participated in by a user and received during the step 102 as part or all of the transaction information. The total retail price for the five products listed in the record is nine dollars and fifty cents, as illustrated by the entry in the field 408. The transaction for or with which the record is associated is "T-41-1730918," as illustrated in the field 410 of the record 400.

During the step 350, product categories involved in the transaction are identified. The product categories to be used are food related and will comprise the following: "SPECIALTY SANDWICH," "SANDWICH," "BEVERAGE," "SIDE ORDER" and "DESSERT." Generally, the product categories used for a particular application will be established in advance. With reference to the record 400, the user is purchasing two products in the "SANDWICH" and "SIDE ORDER" product categories, and one product each in the "SPECIALTY SANDWICH" and "BEVERAGE" categories.

Figure 7:
FIG. 7 is a tabular representation of a possible data structure for a record illustrating groups for the food products illustrated in FIG. 6.
Figure 8:
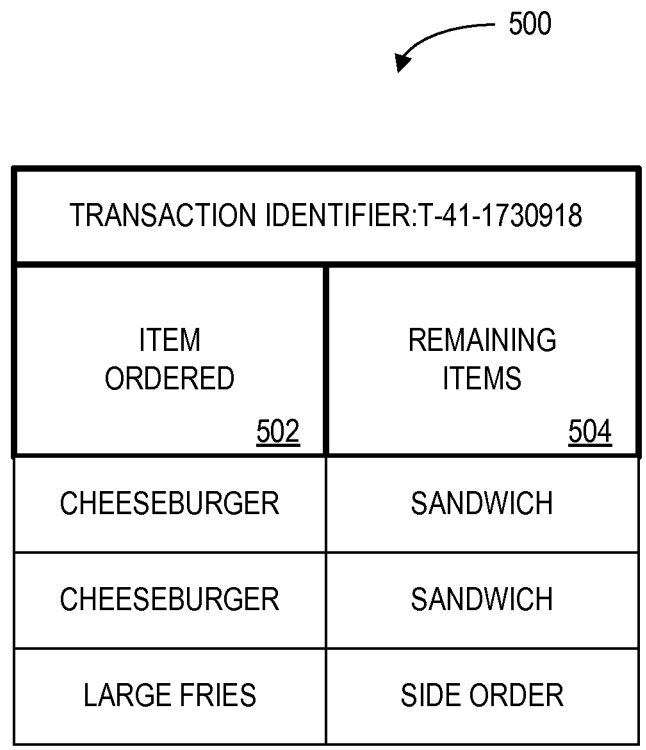
FIG. 8 is another tabular representation of a possible data structure for a record illustrating product groups and complementary product categories for the food products illustrated in FIG. 6.
Figure 10:
FIG. 10 is a tabular representation of a possible data structure for a record illustrating an offer amount determined for the food products illustrated in FIG. 6.

In an embodiment where an additional supplemental product may be offered for sale to the user, a record 450 illustrated in FIG. 7 may be created as part of the step 352. As previously discussed above, the step 352 is part of the step 300 which is, in turn, part of the step 104 during which one or more supplemental products are determined or otherwise identified. During the step 352, product groups are constructed using the product categories determined during the step 350 for the products purchased by the user.

In this example, one product group is designated as "MEAL 1" and includes a specialty sandwich, a side order, a beverage, and a dessert, as indicated by the entries in the field 452 of the record 450. Groupings of complementary products may be based on criteria other than "meals." For example, a high profit margin product may be considered as a complementary product for a low profit margin product, a ticket to a child oriented movie may be considered as a complementary product for a child meal at restaurant, and a coupon for a product may be considered as a complementary product to a product purchased during a transaction.

Products which the customer has ordered during the transaction that fall within the product categories listed in the field 452 are provided in the entries for the field 454. As shown in the record 450, the user has ordered four components of a "MEAL 1" product group, namely a double-decker burger, one medium order of French fries, and one large soft drink. The remaining items that the user ordered (i.e., the two cheeseburgers and the large order of French fries) are listed in the record 500 illustrated in FIG. 8, but are not sufficient to complete the product group "MEAL 1." The remaining items listed in the field 502 fall within the product categories listed in the field 504. In addition, the remaining items may form a part of a product group "MEAL 2," as shown in the record 550 illustrated in FIG. 9.

The "MEAL 2" product category requires five elements, as listed in the field 552 in the record 550, namely two products in the "SANDWICH" product category, one produce in the "SIDE ORDER" product category, one product in the "BEVERAGE" category, and one product in the "DESSERT" category. The remaining products (i.e., the two cheeseburgers and the large order of French fries) not associated with the "MEAL 1" product group form three of the five products needed for the "MEAL 2" group, as shown by the entries in the field 554 for the record 550.

During the step 354, at least one complementary product category is determined in relation to the products being purchased by the user (i.e., one double-decker burger, two cheeseburgers, one medium order of fries, one large order of fries, and one large soft drink) and the product categories identified during the step 350. As illustrated by the records 450 and 550, a complementary product might include a "DESSERT," which would complete "MEAL 1" or would help complete "MEAL 2," or a "BEVERAGE," which would help complete "MEAL 2." Other complementary product categories may also be available.

During the step 356, an offer amount for the supplemental product is determined or calculated. As shown in the field 408 in the record 400 illustrated in FIG. 6, the total retail price of the products being purchased by the user is nine dollars and fifty cents. As shown in record 600, particularly the field 602, illustrated in FIG. 10, a round up amount of fifty cents has been determined during the step 356. While the round up amount of fifty cents may be determined in many ways, for purposes of the present example it will be assumed that the user tendered a ten dollar bill or ten dollars in other bill amounts to cover the nine dollar and fifty cents price for the products and fifty cents is the change due to the customer during the transaction (i.e., $10.00−$9.50=$0.50).

During the step 358, a pool of supplemental products is determined based on the complementary product categories identified during the step 354 and the offer amount determined during the step 356. The pool of supplemental products may be products that fall within the complementary product categories determined during the step 354 but have a cost to the provider less than or equal to the offer amount determined during the step 356. After the step 358 is completed a record, such as the record 650 illustrated in FIG. 11 may be created which lists potential supplemental products and their associated costs.

Most of the products listed in the record 650 fall within "DESSERT" or "BEVERAGE" product categories determined to be complementary product categories during the step 354. The two products in the "SANDWICH" category listed in the record 650 may also be considered as possible supplemental products, even though they don't necessarily fill any particular product group. They may always be added as a matter of course to the list of potential supplemental products determined during the step 358, or they may be added in accordance with a rule, heuristic, process, etc. that may take into account the number and/or type of products available or in inventory for a product category or other factors.

After the step 358 is completed, thereby completing the step 300, the step 104 in the method 100 continues to the step 302 during which scores for the products determined or selected during the step 358 are calculated. As previously discussed above, many different scoring processes or approaches are possible, including scoring approaches based on profits, popularity, and discounts. A detailed example using several scoring approaches is provided below.

As previously discussed above, a second example of a determination of a supplemental product is provided wherein a replacement supplemental product is determined using the method 100. Like the previous example where a pool of possible additional supplemental products was determined, the second example will be directed to use of the method 100 and the system 200 by a restaurant or other food provider to sell food products such as hamburgers, cheeseburgers, French fries, etc. to users.

In implementations of the method 100 wherein one or more possible replacement products are determined, the step 300 proceeds in accordance with the steps illustrated in FIG. 5. As previously discussed above, in this type of implementation, the steps 380, 382 and 384 comprise at least part of the step 300 in the step 104.

During the step 380, possible replacement products are determined for the products being purchased by a user. In this example, the user is purchasing one double-decker burger, two cheeseburgers, one medium order of fries, one large order of fries, and one large soft drink. Possible replacement products may be determined according to one or more rules or processes and may have one or more terms or conditions. For example, possible replacement products may be required to have at least a designated minimum retail price, a designated minimum profit margin, etc. As a further example, replacement products for food products may be as illustrated in the table 700 illustrated in FIG. 12. As shown in the table 700, food products listed in a item ordered field 702 may be replaced by food products listed in a replace item field 704. The cost to replace the food products listed in the field 702 with the food products listed in the field 704 is listed in a replacement cost field 706. For example, a hamburger may be replaced by a cheeseburger, a quarter pound hamburger, or a double-decker burger. Similarly, a cheeseburger can be replaced by a quarter pound hamburger or a double-decker burger. Likewise, a small soft drink can be replaced by a medium soft drink or a large soft drink. In some embodiments, the replacement rules may be category driven such that any product from one product category may replace any other product from that product category.

For the products being purchased by the user in the current example, the possible replacement products identified during the step 380 are shown in the table 750 illustrated in FIG. 13. The user has two replacement options for one or both of the cheeseburgers that the user is purchasing and one replacement option for the medium French fries that the user is purchasing.

During the step 382, the offer amount for the products identified during the step 380 and illustrated in the table 750 are computed or identified. The offer amount may be the amount of change due a customer during a transaction, a fixed amount (e.g., two dollars), etc. In addition, the offer amount may comprise only a monetary figure or amount, only a non-monetary figure or amount, or a combination of a monetary figure or amount and a non-monetary figure or amount. In this example, the offer amount is determined to be fifty cents, as previously described above.

During the step 384, one or more replacement supplement products are identified and selected from the products identified during the step 380. In general, the pool of potential replacement supplemental products identified during the step 384 will be those products identified during the step 380 that can be offered for a replacement cost that is less than or equal to the offer amount determined during the step 382. In the present example, all of the possible replacement products identified during the step 380 and listed in the table 750 have a replacement cost less than fifty cents (e.g., the offer amount determined during the step 382).

After the step 300 in the step 104 is completed, scores for the possible supplemental products, both replacement and additional, determined or identified during the step 300 are calculated or determined during the step 302. Possible scoring approaches for products include, but are not limited to, a profit based scoring approach, a popularity based scoring approach, a discount based scoring approach, a composite or collaborative scoring approach, etc.

Now referring to FIG. 14, an example of a profit based scoring approach will now be described in detail. A record 800 created during the step 300 of the step 104 may contain information for both an additional supplemental product and a replacement supplemental product. For the food example discussed above where a user is purchasing one double-decker burger, two cheeseburgers, one medium order of fries, one large order of fries, and one large soft drink during the transaction "T-41-173-0918," possible additional supplemental products include products falling into the "DESSERT" and "BEVERAGE" categories, as indicated in fields 802 and 804 of the record 800, and possible replacement supplemental products include replacing either or both of the user's cheeseburgers with a quarter pound hamburger and/or a double-decker burger and replacing the user's medium order of French fries with a large order of French fries, as indicated in fields 806 and 808 of the record 800. The offer amount for the supplemental product is fifty cents, as indicated in the offer amount field 810 and is presumably based on the transaction subtotal amount of nine dollars and fifty cents indicated in the subtotal field 812 and tender amount of ten dollars offered by the customer to purchase the food products.

In a profit based scoring approach, the cost of each supplemental product is used to determine the profit that the supplemental product would produce for the transaction at the offer amount, relative to the profits that the other supplemental products would produce for the transaction. A profit calculation may be based on a straight monetary amount, on a percentage of total transaction cost, a commission, etc.

For example, in the record 800, three potential additional supplemental products are listed in the field 802 and three potential replacement products are listed in the field 808. Each of the six potential supplemental products has an associated cost. The costs for the three possible additional supplemental products are provided in an item cost field 814 while the costs for the three possible replacement supplemental products are provided in an replacement cost field 816. Based on the offer amount of fifty cents provided in the field 810 and the costs in the fields 814, 816, item profits can be determined for the three possible additional supplemental products, as listed in an item profit field 818, and for the three possible replacement supplemental products, as listed in an item profit field 820. The figures in the item profit fields 818, 820 are computed by taking the difference between the offer amount of fifty cents and the respective entries in the item cost fields 814, 816. For example, the additional supplemental product of cookies has an item cost of twenty-three cents, as provided in the field 814, and an item profit of twenty-seven cents (i.e., $0.27=$0.50−$0.23), as provided in the field 818. Similarly, the replacement supplemental product of a quarter pound hamburger has a replacement cost of eighteen cents, as provided in the field 816, and an item profit of thirty-two cents (i.e., $0.32=$0.50−$0.18), as provided in the field 820.

After the individual item profits are calculated for the possible supplemental products listed in the fields 802 and 808, their respective relative percentages of profit are determined and provided in relative profit percentage fields 822, 824 of the record 800. The percentage of total profit for a possible supplemental product listed in the fields 802, 808 is computed by taking the product's associated item profit as provided in the item profit field 818 or 820 and dividing it by the sum of all of the profits provided in the item profit fields 818, 820 and forming a percentage. For example, the sum of all of the individual item profits in the fields 818, 820 is $1.62 (i.e., $1.62=$0.27+$0.19+$0.39+$0.32+$0.25+$0.20). The additional supplemental product of cookies has an item profit of twenty-seven cents, therefore its relative profit percentage is 16.67 percent (i.e., %16.67=%100×$0.27/$1.62), as provided in the relative profit percentage field 822. The additional supplemental product of an ice cream cone has an item profit of thirty-one cents, therefore its relative profit percentage is 11.73 percent (i.e., %11.73=%100×$0.19/$1.62), as provided in the relative profit percentage field 822. The replacement supplemental product of a quarter pound hamburger has an item profit of thirty-two cents, therefore its relative profit percentage is 19.75 percent (i.e., %19.75=%100×$0.32/$1.62), as provided in the relative profit percentage field 824.

In some embodiments, the percentages provided in the fields 822, 824 become the profit based scores for the possible supplemental products, as provided in profit based score fields 826, 828. For the six possible supplemental products provided in the record 800, the additional supplemental product of medium soft drink has the highest score (i.e., 24.07). In some embodiments, the profit based scores in the fields 826, 828 may be used as part of a composite score, as will be discussed in more detail below. The profit based scores may be weighted as part of the composite score so that the relative importance of the profit based scoring approach as compared to other scoring approaches can be controlled. The record 800 includes a weighting factor of four, as provided in a weight field 830. Therefore, the weighted profit based scores for the possible supplemental products listed in the fields 802, 808 are the profit based scores provided in the fields 826, 828 multiplied by the weight factor of four provided in the weight field 830. The weighted profit based scores for the possible supplemental products listed in the fields 802, 808 are provided in weighted scores fields 832, 834 in the record 800.

Now referring to FIG. 15, an example of a popularity based scoring approach will now be described in detail. A record 850 created during the step 300 of the step 104 may contain information for both an additional supplemental product and a replacement supplemental product, as previously discussed above in conjunction with the record 800. Therefore, for the transaction "T-41-173-0918" wherein a user is purchasing one double-decker burger, two cheeseburgers, one medium order of fries, one large order of fries, and one large soft drink, the record 850 may include the same fields 802, 804, 806, 808, 810, 812, and 830 previously described above.

The popularity based scoring approach is based on the percentage of one or more users who have in the past accepted a given product as a supplemental product, thereby creating a "take rate" or "accept rate" for the supplemental product. An accept rate may be specific to a particular user or a composite of the particular user's acceptance of an item and overall consumer acceptance of the item.

The take or accept rates for the additional supplemental products provided in the field 802 are provided in an accept rate field 852 while the accept rates for the replacement supplemental products provided in the field 808 are provided in an accept rate field 854. For example, when cookies are offered as an additional supplemental product during a transaction, the offer is accepted fifteen percent of the time, as shown in the field 852. Similarly, when an ice cream cone is offered as an additional supplemental product during a transaction, the offer is accepted six percent of the time, as shown in the field 852. Likewise, when a quarter pound hamburger is offered as a replacement supplemental product for a cheeseburger during a transaction, the offer is accepted twelve percent of the time, as shown in the field 854.

After the individual item accept rates for the possible supplemental products listed in the fields 802 and 808 are determined, their respective relative percentage of popularity is determined and provided in relative popularity percentage fields 856, 858 of the record 850. The percentage of total popularity for a possible supplemental product listed in the fields 802, 808 is computed by taking the product's associated item accept rate as provided in the item profit field 852 or 854 and dividing it by the sum of all of the accept rates provided in the item accept rate fields 852, 854 and forming a percentage. For example, the sum of all of the individual item accept rates in the fields 852, 854 is ninety-five percent (i.e., %95=%15+%6+%21+%12+%9+%32). The additional supplemental product of cookies has an item accept rate of fifteen percent, therefore its relative accept rate percentage is 15.79 percent (i.e., %15.79=%100×%15/%95), as provided in the relative popularity percentage field 856.

The additional supplemental product of an ice cream cone has an item accept rate of six percent, therefore its relative accept rate percentage is 6.32 percent (i.e., %6.32=%100× %6/%95), as provided in the relative popularity percentage field 856. The replacement supplemental product of a quarter pound hamburger has an item accept rate of twelve percent, therefore its relative accept rate percentage is 12.63 percent (i.e., %12.63=%100×%12/%95), as provided in the relative popularity percentage field 858.

In some embodiments, the percentages provided in the fields 856, 858 become the popularity based scores for the possible supplemental products, as provided in popularity based score fields 860, 862. For the six possible supplemental products provided in the record 850, the replacement supplemental product of medium French fries has the highest score (i.e., 33.68). In some embodiments, the popularity based scores in the fields 860, 862 may be used as part of a composite score, as will be discussed in more detail below. The popularity based scores may be weighted as part of the composite score so that the relative importance of the popularity based scoring approach as compared to the profit based scoring approach discussed above and to other scoring approaches can be controlled. The record 850 includes a weighting factor of three, as provided in the weight field 830 for the record 850. Therefore, the weighted popularity based scores for the possible supplemental products listed in the fields 802, 808 are the popularity based scores provided in the fields 860, 862 multiplied by the weight factor of three provided in the weight field 830. The weighted popularity based scores for the possible supplemental products listed in the fields 802, 808 are provided in weighted scores fields 864, 868 in the record 850.

Now referring to FIG. 16, an example of a discount based scoring approach will now be described in detail. A record 900 created during the step 300 of the step 104 may contain information for both an additional supplemental product and a replacement supplemental product, as previously discussed above in conjunction with the record 800. Therefore, for the transaction "T-41-173-0918" wherein a user is purchasing one double-decker burger, two cheeseburgers, one medium order of fries, one large order of fries, and one large soft drink, the record 850 may include the same fields 802, 804, 806, 808, 810, 812, and 830 previously described above.

The discount based scoring approach is based on the discount off the retail price which the possible supplemental products provided in the fields 802, 808 may be offered if the possible supplemental products are offered to a user for the offer amount provided in the field 810. The retail prices for the three possible additional supplemental products provided in the field 802 are provided in a retail price field 902. Similarly, the retail prices for the three possible replacement supplemental products provided in the field 808 are provided in a retail price field 904. The discount for each of the three possible additional supplemental products provided in the field 802 are given in a discount field 906 and are determined by subtracting the offer amount provided the field 810 (e.g., fifty cents) from the products' respective retail prices provided in the field 902. Similarly, the discount for each of the three possible replacement supplemental products provided in the field 808 are given in a discount field 908 and are determined by subtracting the offer amount provided the field 810 (e.g., fifty cents) from the products' respective retail prices provided in the field 904.

After the individual item discounts for the possible supplemental products listed in the fields 802 and 808 are determined, their respective relative percentage of discount is determined and provided in relative discount percentage fields 910, 912 of the record 900. The percentage of total discount for a possible supplemental product listed in the fields 802, 808 is computed by taking the product's associated discount as provided in the field 906 or 908 and dividing it by the sum of all of the discounts provided in the discount fields 910, 912 and forming a percentage. For example, the sum of all of the individual discounts in the fields 906, 908 is $2.60 (i.e., $2.60=$0.35+$0.60+$0.70+$0.25+$0.50+$0.20). The additional supplemental product of cookies has a discount of thirty-five cents, therefore its relative discount percentage is 13.46 percent (i.e., %13.46=%100×$0.35/$2.60), as provided in the relative discount percentage field 910. The additional supplemental product of an ice cream cone has a discount of sixty cents, therefore its relative discount percentage is 23.08 percent (i.e., %23.08=%100×$0.60/$2.60), as provided in the relative discount percentage field 910. The replacement supplemental product of a quarter pound hamburger has a discount of twenty-five cents, therefore its relative discount percentage is 9.62 percent (i.e., %9.62=%100× $0.25/$2.60), as provided in the relative profit percentage field 912.

In some embodiments, the percentages provided in the fields 910, 912 become the discount based scores for the possible supplemental products, as provided in profit based score fields 914, 916. For the six possible supplemental products provided in the record 900, the additional supplemental product of a medium soft drink has the highest score (i.e., 26.92). In some embodiments, the discount based scores in the fields 914, 916 may be used as part of a composite score, as will be discussed in more detail below. The discount based scores may be weighted as part of the composite score so that the relative importance of the discount based scoring approach as compared to the profit and popularity based scoring approaches discussed above other can be controlled. The record 900 includes a weighting factor of two, as provided in the weight field 830 for the record 900. Therefore, the weighted discount based scores for the possible supplemental products listed in the fields 802, 808 are the discount based scores provided in the fields 914, 916 multiplied by the weight factor of two provided in the weight field 830. The weighted popularity based scores for the possible supplemental products listed in the fields 802, 808 are provided in weighted scores fields 918, 920 in the record 900.

Now referring to FIG. 17, a composite score using the profit scoring approach of FIG. 14, the popularity scoring approach of FIG. 15, and the discount scoring approach of FIG. 16 is illustrated for a record 950. The record 950 is directed to the same three possible additional supplemental products and three possible replacement supplemental products previously discussed above. Therefore, the record includes the fields 802, 808, 810, and 812 previously discussed above.

The record 950 includes the weighted profits scores from the fields 832, 834 in the record 800, the weighted popularity scores from the fields 864, 868 in the record 850, and the weighted discount scores from the fields 918, 920 in the record 900, as illustrated in scoring fields 952 and 954, 956 and 958, and 960 and 962, respectively, in the record 950. As previously discussed above, scores based on the profit based scoring approach are weighted by a factor of four, scores based on the popularity based scoring approach are weighted by a factor of three, and scores based on the discount based scoring approach are weighted by a factor of two. Thus, in this example, the profit based scores are considered to be relatively more important than both the popularity based scores and the discount based scores and may influence the final composite score more significantly than either of the popularity based scores or the discount based scores.

The cumulative scores for each of the three possible additional supplemental products are provided in cumulative score field 964 while the cumulative scores for the three possible additional supplemental product are provided in cumulative score field 966. For example, the cumulative score for the possible supplemental product of cookies is 140.96 (i.e., 140.96=66.67+47.37+26.92), as illustrated in the field 964. Similarly, the cumulative score for the possible supplemental product of quarter pound hamburger cookies is 136.13 (i.e., 136.13=79.01+37.89+19.23), as illustrated in the field 966.

As shown in the record 950, the supplemental products range in scores from 112.12 to 216.48. At any time during the scoring process, the system 200 may eliminate one or more potential supplemental products from further consideration by "filtering" out supplemental products based on certain criteria. For example, a "filter" may dictate that no product having a profit score lower than some predetermined threshold should be included. A different filter may eliminate products that have been accepted by a user in the past as a supplemental product. In addition, filters may act to ensure that no disadvantageous product is offered to a user or customer. Filters may be based on delivery costs of products, current service times for products, offer relevancy, the time to prepare a product for sale, or other factors.

In addition to filters, the system 200 may use elimination rules to eliminate certain products or product categories from further consideration. Elimination rules function in a similar manner to filters in that they limit one or more products from being considered or selected as supplemental products. For example, an elimination rule might be used that instructs the controller 202 or a point-of-sale terminal never to offer bacon as a replacement supplemental product to a user if the user purchased a bacon cheeseburger. As another example, an elimination rule might instruct the controller 202 or a point-of-sale terminal never to offer a product to a user as a replacement product that the user has already ordered or that the user is ordering during the current transaction. An elimination rule may prevent offers that have previously been offered to a particular user or customer from being made again to the particular user or customer, thereby preventing the user or customer from being able to expect that they will receive a supplemental product offer identical to a supplemental product offer received during a previous transaction.

Upon completion of the scoring of possible supplemental products during the step 302, one or more of the possible supplemental products may be chosen or selected during the step 304 as supplemental products, thereby completing the step 104 of the method 100. One or more possible supplemental products may be chosen during the step 304 or the step 104. In addition to the filters and elimination rules, the system 200 may force or require designated products or types of products to be offered as supplemental products. Such a requirement for a product to be offered as a supplemental product will be referred to as a "forced option." For example, during use of the method 100, the controller 202 or a point-of-sale terminal may want to make sure that one additional supplemental product, one replacement or upgraded supplemental product, etc. are selected during the step 104 and offered for sale to a user, regardless of how one or more of the supplemental products or types of supplemental products scored. A "forced option" process accomplishes this by "forcing," for example, a replacement supplementary product to be offered regardless of its score as compared to other types of offers or the scores of other products. It still may be the case that the forced option has the highest score of its type, even though that score may be significantly less than the score associated with an offer of another type.

In some embodiments a "weighted randomization" approach may be used to randomly select a supplemental product from a pool of potential supplemental products. According to these embodiments, each potential supplemental product in a group of possible supplemental products is selected in proportion to its score, such as its weighted cumulative score, relative or as compared to the sum of all of the scores associated with the products that form for the pool of possible supplemental products. That is, each possible supplemental product in a group of possible supplement products may be chosen as the supplemental product to offer for sale to a user, the chance of each possible supplemental product being chosen being dependent on its weighted score, such as a weighted cumulative score, relative to the sum of all of the weighted scores. For example, for the six possible supplemental products listed in FIG. 17, each has a weighted cumulative score listed in the field 964 or 966. The total of all of the weighted cumulative scores is 900.01 (i.e., 900.01=140.96+112.02+216.48+136.13+128.61+165.81).

Thus, the cookies, which have a cumulative score of 140.96, have a normalized or relative percentage of 15.66 percent (i.e., %15.66=%100×140.96/900.01), the ice cream cone has a normalized or relative percentage of 12.45 percent (i.e., %12.45=%100×112.02/900.01), the medium soft drink has a normalized or relative percentage of 24.05 percent (i.e., %24.05=%100×216.48/900.01), the quarter pound hamburger has a normalized or relative percentage of 15.13 percent (i.e., %15.13=%100×136.13/900.01), the double-decker burger has a normalized or relative percentage of 14.29 percent (i.e., %14.29=%100×128.61/900.01) and the order of large fries has a normalized or relative percentage of 18.42 percent (i.e., (%18.42=(%100×165.81/900.01). The total of the six relative percentages for the six possible supplemental products total to one-hundred percent (i.e., %100=%15.66+%12.45+%24.05+%15.13+%14.29+%18.42). In the weighted randomization process for these six products, cookies will be randomly chosen as a supplemental product 15.66 percent of the time, an ice cream cone will be randomly chosen as a supplemental product 12.45 percent of the time, a medium soft drink will be randomly chosen as a supplemental product 24.05 percent of the time, a quarter pound hamburger will be randomly chosen as a supplemental product 15.13 percent of the time, a double-decker burger will be randomly chosen as a supplemental product 14.29 percent of the time, and an order of large fries will be randomly chosen as a supplemental product 18.42 percent of the time. It should be noted that, in some embodiments, non-weighted randomization processes may also be used.

A weighted randomization approach helps protect retailers from losing sales at full or normal price by not offering the same product as a supplemental product all the time in response to given order, thereby simultaneously insuring that reasonably relevant offers for supplemental products are made the majority of the time to customers. Thus, customers may not be able to predict which supplemental product will be offered to the customer, thereby increasing the chances that the customer will buy a desired product at normal price. In some embodiments, a management override may alter the weighting of supplemental products temporarily or permanently, such as when a manager knows that a particular product is out of stock or even no longer available.

In some embodiments, the controller 202 or a point-of-sale terminal may use flexible and dynamically developed scoring or other processes for identifying or selecting supplemental products, thereby permitting the controller 202, point-of-sale terminal, or an administrator to decide which scoring processes to use and their sequence of operation. Changing uses and sequences of scoring processes can have positive effects on the outcome of the offer generation process and overall user acceptance rates, profits, etc. of supplemental products. As more information is learned about user buying patterns, additional offer pool, scoring and/or filtering processes can be created and easily inserted into the process. For example, a filter based on individual employee (e.g., cashier, check out clerk, etc.) skills may be introduced so as to filter out supplemental product offers for which the employee has shown a propensity to fail when making the supplemental product offer. The configuration, operation and use of a method and system for motivating employees to provide or make supplemental product offers is described in U.S. patent application Ser. No. 09/540,710 entitled METHOD AND SYSTEM FOR MOTIVATING AN EMPLOYEE TO PERFORM A BEHAVIOR RELATED TO AN UPSELL, all of which is incorporated herein by reference. In addition, the configuration, operation and use of a method and system for providing promotional offers via point-of-sale terminals is described in U.S. patent application Ser. No. 09/538,751 entitled, DYNAMIC PROPAGATION OF PROMOTIONAL INFORMATION IN A NETWORK OF POINT-OF-SALE TERMINALS, all of which is incorporated herein by reference.

Many different alternatives are available for selecting supplemental products or building a pool of possible supplemental products during the step 104. For example, instead of taking an initial pool of supplemental products and pairing it down (a top-down approach), a bottom-up approach could be taken in which a list of supplement products to offer is built up over time or over transactions. A method for accomplishing this would be rules-driven in a manner similar to the present invention. Thus, rather than starting with the complete selection of options and paring down the options, the system could use the order content to select from pre-defined offers and then, only those products that individually score well during a transaction as compared, one at a time, with the current order content of the transaction may become supplemental products for the transaction.

In some embodiments, a user may initiate the method 100 by pressing a button, either dedicated or virtual, on a user device or point-of-sale terminal, asking for an offer for a supplemental product, swiping a shopper card, etc. By enabling the system 200 and/or the method 100 so as to be user initiated, any possibility of annoying or offending users with supplementary product offers is greatly reduced, or even possibly eliminated. Further, the user device or point-of-sale terminal could be used to present the supplementary product offer to the user. For example, the user device or point-of-sale terminal may include a touch-screen monitor on which supplementary product offers are presented to the user. In addition, the user's selection or acceptance of a supplemental product may be received via a touch screen on the user device or point-of-sale terminal.

Figure 18:
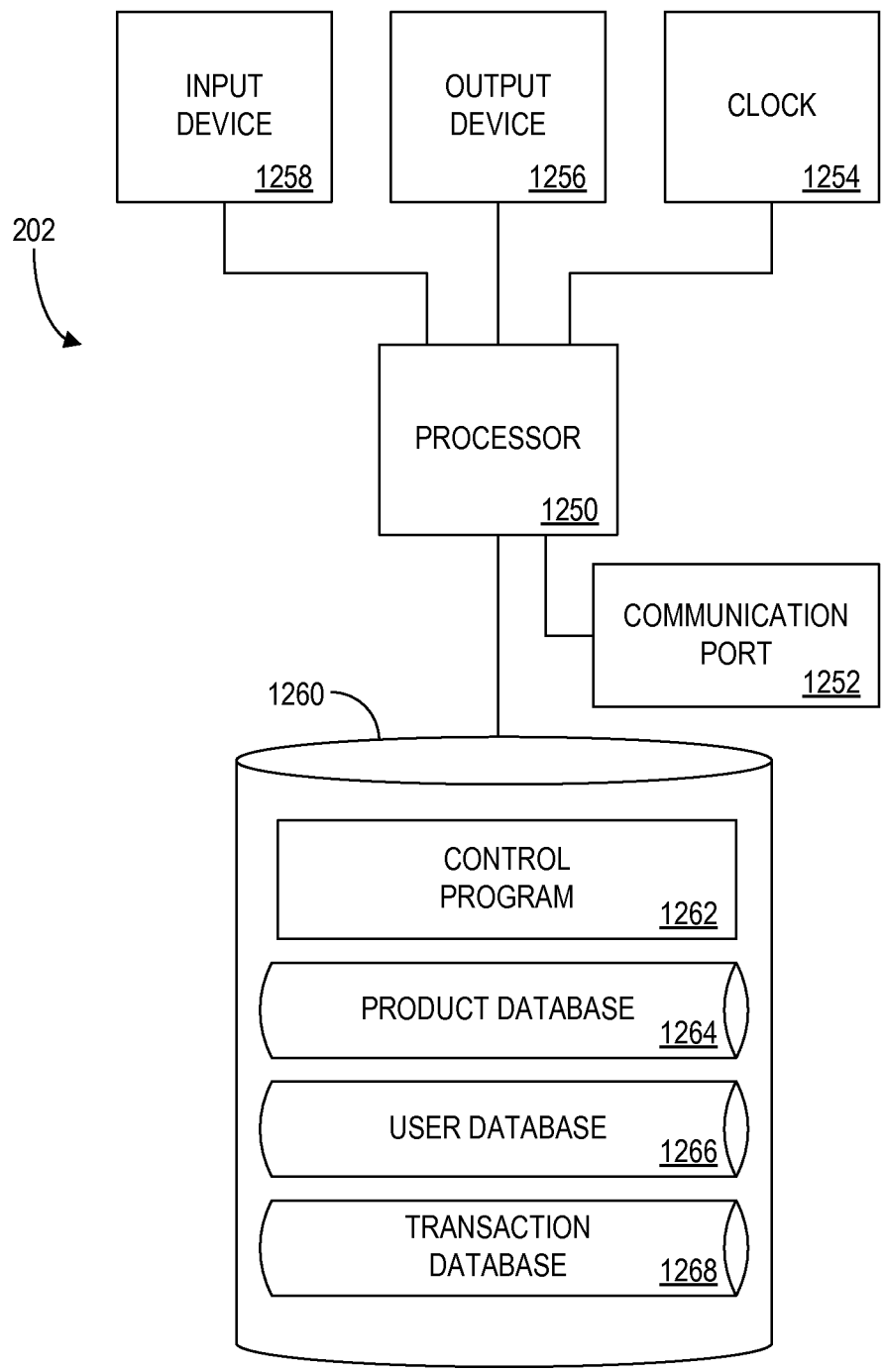
FIG. 18 is a block diagram illustrating a representative controller or point-of-sale terminal of FIG. 2.

Now referring to FIG. 18, a representative block diagram of a controller, such as the controller 202, or a point-of-sale terminal, such as the point-of-sale terminal 204 is illustrated. The configuration, operation and use of a point-of-sale terminal for providing offers is described in copending U.S. patent application Ser. No. 09/538,751 entitled, DYNAMIC PROPAGATION OF PROMOTIONAL INFORMATION IN A NETWORK OF POINT-OF-SALE TERMINALS, all of which is incorporated herein by reference.

The controller 202 may include a processor, microprocessor or microchip, central processing unit, or computer 1250 that is in communication with or otherwise uses or includes one or more communication ports 1252 for communicating with user devices and/or other devices. For example, if the controller 202 is connected to the user device 208 via an Ethernet local area network, the user device 206 via a cellular telephone network, and the user device 208 via a Token Ring type local area network, the controller 202 may have an Ethernet adapter as one communication port to allow the controller 202 to communicate with the user device 202, a connection to a cellular telephone network as another communication port to allow the controller 202 to communicate with the user device 206 and a Token Ring adapter to allow the controller 202 to communicate with the user device 208. Of course, in some embodiments, the controller 202 and other devices in the system 200 may user wireless communication to communicate with each other and to exchange information.

The controller 202 may also include an internal clock element 1254 to maintain an accurate time and date for the controller 202 create time stamps for messages, information, indications, etc. generated via the controller 202 or received by the controller 202, etc.

If desired, the controller 202 may include one or more output devices 1256 such as a printer, infrared or other transmitter, antenna, audio speaker, display screen or monitor, text to speech converter, etc., as well as one or more input devices 1258 such as a bar code reader or other optical scanner, infrared or other receiver, antenna, magnetic stripe reader, image scanner, roller ball, touch pad, joystick, touch screen, microphone, computer keyboard, computer mouse, etc. In addition, the controller 202 may include a voice recognition system or interactive voice response unit as an input device 1258 to aid in or enable receiving and processing of transaction information, messages, indications, etc. The controller 202 may also include a fingerprint scanner or reader, a retinal scanner, a voice analyzer, or other biometrics data input device as an input device 1258 to allow the controller 202 to identify users. If desired, the controller 202 may also function as a user device and/or point-of-sale terminal.

In addition to the above, the controller 202 may include a memory or data storage device 1260 to store information, software, databases, device drivers, customer information, transaction information, product information, etc. The memory or data storage device 260 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk. The processor 250 and the data storage device 260 in the controller 202 may each be, for example: (i) located entirely within a single computer or other computing device; or (ii) connected to each other by a remote communication medium, such as a serial port cable, telephone line or radio frequency transceiver. In one embodiment, the controller 202 may comprise one or more computers that are connected to a remote server computer for maintaining databases.

A conventional personal computer or workstation with sufficient memory and processing capability may be used as the controller 202. In one embodiment, the controller 202 operates as or includes a web server for an Internet environment. The controller 202 preferably transmits and receives data related to transactions and is capable of high volume transaction processing, performing a significant number of mathematical calculations in processing communications and database searches. A Pentium™ microprocessor such as the Pentium III™ microprocessor, manufactured by Intel Corporation may be used for the processor 1250. Equivalent processors are available from Motorola, Inc., AMD, or Sun Microsystems, Inc. The processor 1250 may also comprise one or more microprocessors, central processing units, computers, computer systems, etc.

While specific implementations and hardware configurations for point-of-sale terminals, user devices, controllers, and contact devices have been illustrated, it should be noted that other implementations and hardware configurations are possible and that no specific implementation or hardware configuration is needed. Therefore, many different types of implementations or hardware configurations can be used in the system 200 and with the method 100 and the methods disclosed herein are not limited to any specific hardware configuration for the system 200.

Software may be resident and operating or operational on the controller 202. The software may be stored on the data storage device 1260 and may include some or all of the following: a control program 1262 for operating the controller 202; a product database 1264 for storing information about products or services; a customer or user database 1266 for storing information about one or more users or customers; and a transaction database 1268 for storing information regarding to sales of products or services.

Each of the databases 1264, 1266 and 1268 and their use and potential data structure will be discussed in more detail below. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Thus, those skilled in the art will understand that the number and content of the entries can be different from those illustrated herein. Not all of the databases 1264, 1266 and 1268 will be used or needed in every embodiment of the method 100 or the system 200. Furthermore, some embodiments of the method 100 or the system 200 may use none or only some of the databases 1264, 1266 and 1268. Of course, there may be embodiments of the method 100 or the system 200 where all of the databases 1264, 1266, and 1268 are used.

The control program 1262 may control the processor 1250. The processor 1250 preferably performs instructions of the control program 1262, and thereby operates in accordance with the present invention, and particularly in accordance with the methods described in detail herein. The control program 1262 may be stored in a compressed, uncompiled and/or encrypted format. The control program 1262 furthermore includes program elements that may be necessary, such as an operating system, a database management system and device drivers for allowing the processor 1250 to interface with peripheral devices, databases, etc. Appropriate program elements are known to those skilled in the art, and need not be described in detail herein. According to an embodiment of the present invention, the instructions of the control program 1262 may be read into a main memory from another computer-readable medium, such as from a ROM to RAM. Execution of sequences of the instructions in the control program 1262 causes the processor 1250 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

As previously discussed above, the product database 1264 can be used to store information and data regarding products, services, etc. The product database 1264 may be used, populated, accessed, and/or updated by a controller, a point-of-sale terminal, a user device, etc. during any of the steps of the method 100. A tabular representation of a possible implementation of, or data structure for, the product database 1264 is illustrated in FIG. 19.

The product database 1264 preferably includes a product/service identifier field 1300 which may contain identifiers or other identifying information for products or services, a product/service name or description field 1302 which may include descriptive information for the products and services identified in the field 1300, and a category field 1304 which may include information regarding the category for the products or services identified in the field 1300. In some embodiments, the product database 1264 may also include information regarding the number or amount available or in inventory of the products identified in the field 1300, the retail price of the products or services identified in the field 1300 in a price field 1306, the cost of the products or services identified in the field 1300 in a cost field 1308, etc.

While the product database 1264 illustrated in FIG. 19 provides information for five products 1310, 1312, 1314, 1316, 1318, 1320, 1322 and 1324 identified by the product identifiers "P-0984-90234," "P-0283-17234," "P-1230-89127," "P-8902-29037," "P-0928-09823," "P-5678-12345," "P-7654-09876" and "P-0123-99887," respectively, in the product identifier field 1300, there is no limit to the number of products or services for which information can be stored in the product database 1264 and different fields may be used in the product database 1264.

As previously discussed above, the user database 1266 can be used to store information and data regarding customers, users, etc. The user database 1266 may be used, populated, accessed, and/or updated by a controller, a point-of-sale terminal, a user device, etc. during any of the steps in the method 100. A tabular representation of a possible implementation of, or data structure for, the user database 1266 is illustrated in FIG. 20. A user database may be used to identify a customer for a variety of purposes, including signing up agreements, tracking the customer's purchases, providing benefits to a customer, etc. Information about the customer may also be stored in the user database, such as the customer's name, mailing address, email address, shopping preferences, telephone number, purchasing history, credit card limit, etc.

The user database 1266 preferably includes a user identifier field 1350 which may contain identifiers or other identifying information for users or customers, potential users or customers, etc., a name field 1352 which may contain information regarding the names of the users or customers identified in the field 1350, a contact information field 1354 which may contain contact information, such as postal addresses, telephone numbers, facsimile telephone number, email addresses, etc. for the users or customers identified in the field 1350, and a payment identifier field 1356 which may contain information regarding credit cards, debit cards, frequent shopping cards, bank accounts, etc. associated with the users or customers identified in the field 1350. While the user database 1266 illustrated in FIG. 20 provides information for seven users or customers 1358, 1360, 1362, 1364, 1366, 1368 and 1370 identified by the user identifiers "C-12-12-123434," "C-49-12-437952," "C-47-83-971234," "C-92-46-982734," "C-09-23-178345," "C-03-04-196337" and "C-05-12-100194," respectively, in the user identifier field 1350, there is no limit to the number of users or customers for which information can be stored in the user database 1266 and different fields may be used in the user database 1266.

As previously discussed above, the transaction database 1268 can be used to store information and data regarding transactions for products and services. The transaction database 1268 may be used, populated, accessed, and/or updated by a controller, a point-of-sale device, a user device, etc. during any of the steps of the method 100. A tabular representation of a possible implementation of, or data structure for, the transaction database 1268 is illustrated in FIG. 21.

The transaction database 1268 preferably includes a transaction identifier field 1400 which may contain identifiers or other identifying information for transactions initiated or conducted by users or customers, a date/time field 1402 which may contain information regarding the date and time of the transactions identified in the field 1400, a user or customer identifier field 1404 which may contain identifiers or other identifying information for users or customers involved in the transactions identified in the field 1400, and a product/service field 1406 which may list one or more products or services involved in the transactions identified in the field 1400. If desired, a transaction price or total field may also be used with the transaction database to store pricing, customer tender amount, or other information regarding the price of the transactions identified in the field 1400.

In some embodiments, the transaction database 1268 may also store identifiers associated with point-of-sale terminals or other devices, retailers, manufacturers, employees, supplemental products, etc. involved in a transaction. In addition, the transaction database 1268 may also include location information for the controller 202, point-of-sale terminal, user device, employee, retailer, user, etc. involved in the transaction. In some embodiments, the transaction database 1268 may also include a status field which may store information regarding whether or not the users identified in the field 1404 accepted or rejected an offer to purchase a supplemental product. The status field preferably uses at least three values: "ACCEPTED," "REJECTED," and "N/A" (for those transactions with no corresponding supplementary product offers). For those embodiments where more than one supplementary product is offered, the status field may also store information relating to which supplementary product was accepted or rejected by a user. Information in the status field may be particularly useful in popularity scoring of potential supplemental products to offer to a user.

While the transaction database 1268 illustrated in FIG. 21 provides information for five transactions 1408, 1410, 1412, 1414 and 1416 identified by the transaction identifiers "T-1-9348275," "T-2-8973462," "T-3-9087234," "T-4-9087234" and "T-5-9087234," respectively, in the transaction identifier field 1400, there is no limit to the number of transactions for which information can be stored in the transactions database 1268 and different fields may be used in the transaction database 1268.

Figure 22:
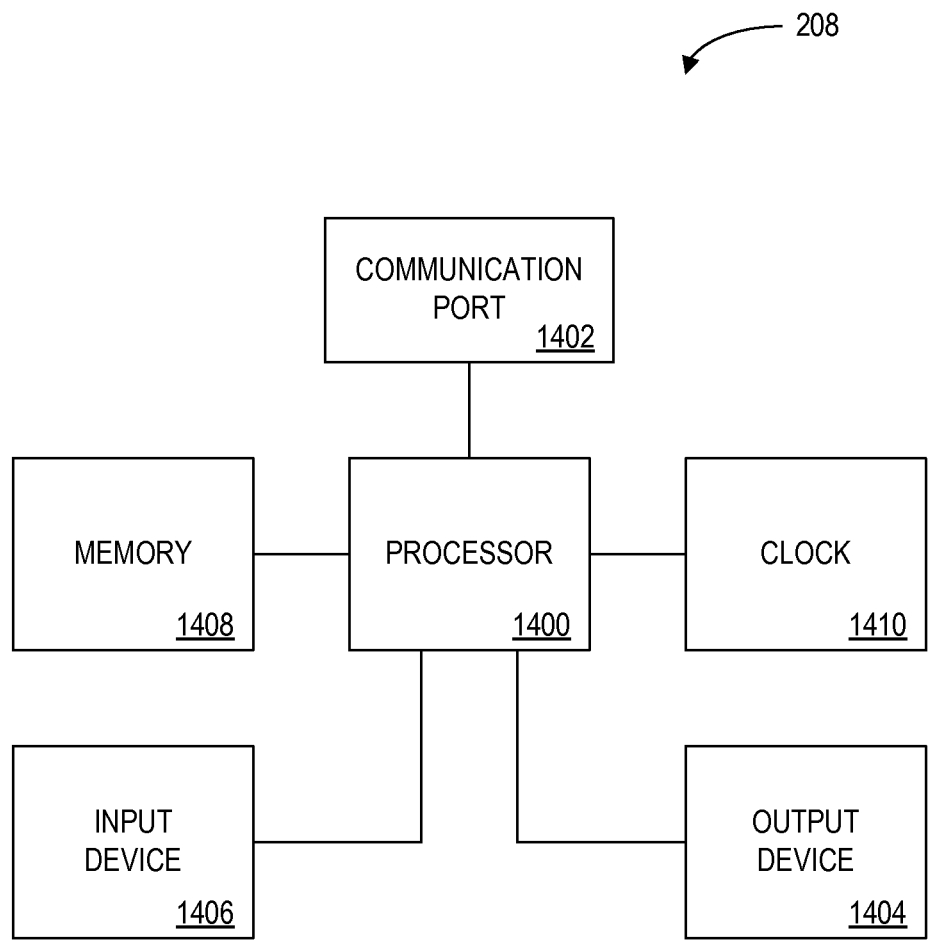
FIG. 22 is a block diagram illustrating a representative user device of FIG. 2.

Now referring to FIG. 22, a representative block diagram of a user device, such as the user device 208, is illustrated. The user device 208 may include a processor, microchip, central processing unit, or computer 1400 that is in communication with or otherwise uses or includes one or more communication ports 1402 for communicating with the controller 202 and/or with a point-of-sale terminal and/or other devices. For example, the user device 208 may have an infrared or other transmitter as one communication port to allow the user device 208 to communicate with the controller 202. In addition, if the user device 202 is connected to the point-of-sale terminal 204 via an Ethernet local area network, the user device 208 will preferably include an Ethernet adapter as a communication port to allow the user device 208 to communicate with the point-of-sale terminal 204. The user device 208 may also include a RF or other wireless transmitter as a communication port 1402 for communicating with the controller 202 and other devices in the system 200.

The user device 208 may include one or more output devices 1404 for conveying information, messages to a user, etc., such as a printer, audio speaker, infrared or other transmitter, antenna, display screen or monitor, text to speech converter, etc., as well as one or more input devices 1406 for receiving information, messages, or indications from a user, such as a bar code reader or other optical scanner, infrared or other receiver, antenna, magnetic stripe reader, image scanner, roller ball, touch pad, joystick, touch screen, microphone, computer keyboard, computer mouse, etc. A user device 208 may include a voice recognition system or interactive voice response unit as an input device 1406 to aid in receiving and processing messages, transaction information, etc. The user device 208 may also include a fingerprint scanner or reader, a retinal scanner, a voice analyzer, or other biometrics data input device as an input device 1406.

In addition to the above, the user device 208 may include a memory or data storage device 1408 to store transaction information, software, databases, device drivers, customer information, customer identifications, product information, messages, etc. The memory or data storage device 1408 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk.

The user device 208 may also include an internal clock element 1410 to maintain an accurate time and date for the user device 208, create time stamps for information, transaction information, messages, etc. generated or received via the user device 208, etc.

As previously discussed above, possible user devices include a personal computer, portable computer, mobile or fixed user station, workstation, network terminal or server, telephone, beeper, kiosk, dumb terminal, personal digital assistant, facsimile machine, etc. If desired, the user device 208 may also function as the controller 202 or a point-of-sale terminal.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be considered as falling within the scope of the invention as defined by the claims which follow. Further, even though only certain embodiments have been described in detail, those having ordinary skill in the art will certainly understand that many modifications are possible without departing from the teachings thereof. All such modifications are intended to be encompassed within the following claims.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

While specific implementations and hardware configurations for the controller 202, point-of-sale terminal 204, and user device 208 have been illustrated, it should be noted that other implementations and hardware configurations are possible and that no specific implementation or hardware configuration is needed. Therefore, many different types of implementations or hardware configurations can be used in the system 200 and with the method 100 and the methods disclosed herein are not limited to any specific hardware configuration.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, ZIP™ disk, flash or optical memory card, microprocessor, solid state memory device, RAM, EPROM, or ROM.

The term "computer-readable medium" as used herein refers to any medium that directly or indirectly participates in providing instructions to a processor for execution. Such a medium may take many forms, including but not limited to, non-volatile media, volatile media, and transmission media. Non-volatile media include, for example, optical or magnetic disks. Volatile media include dynamic random access memory (DRAM), which typically constitutes the main memory. Transmission media include coaxial cables, copper wire and fiber optics, including the wires that comprise a system bus coupled to a processor. Transmission media can also take the form of acoustic, electrical or electromagnetic waves, such as those generated during radio frequency (RF) and infrared (IR) data communications.

The connections or communications between user devices, customer devices, the controller, point-of-sale terminals, retailer devices, etc. discussed herein is only meant to be generally representative of cable, computer, telephone, or other communication or data networks and methods for purposes of elaboration and explanation of the present. The connections are also intended to be representative of, and include all or a part of, the Internet, the World Wide Web, and other privately or publicly operated networks, including wide area networks, local area networks, data communication networks or connections, intranets, routers, satellite links or networks, microwave links or networks, cellular telephone or radio links, fiber optic transmission lines, ISDN lines, T1 lines, etc. In addition, as used herein, the terms "computer," "user device," "terminal," "client," "device" and "client device" are generally interchangeable and are meant to be construed broadly and to include, but not be limited to, all clients, client devices or machines, personal digital assistants and palm top computers, cash registers, terminals, computers, point-of-sale devices, processors, servers, etc. connected or connectable to a computer or data communications network and all devices on which Internet-enabled software, such as the NETSCAPE COMMUNICATOR™ or NAVIGATOR™ browsers, MOSAIC™ browser, or MICROSOFT INTERNET EXPLORER™ browsers, can operate or be run. The term "browser" should also be interpreted as including Internet-enabled software and computer or client software that enables or allows communication over a computer network and Internet-enabled or World Wide Web enabled, monitored, or controlled devices such as WebTV™ devices, household appliances, phones, etc.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method comprising:
   receiving, by a controller device, information for a transaction;
   determining, by the controller device, a pool of at least one potential supplemental product;
   scoring, by the controller device, at least one potential supplemental product in said pool, based on (i) the information for the transaction and (ii) one or more of the following types of information:
      respective profitability of at least one potential supplemental product,
      respective popularity of at least one potential supplemental product,
      one or more preferences of the user,
      a respective number of at least one potential supplemental product in inventory,
      a business rule for scoring potential supplemental products, and
      a purchase history of the user;
   selecting for said transaction, by the controller device based on the scoring, at least one supplemental product from said pool;
   determining, by the controller device, an offer amount for said at least one selected supplemental product;
   providing, by the controller device, an indication of said at least one supplemental product selected from said pool and an indication of the offer amount.

2. The method of claim 1, in which the controller device is in communication with at least one of a user device, a point-of-sale terminal, a web server, and a retailer device.

3. The method of claim 1, wherein providing the indication comprises:
   providing, by the controller device, the indication of said at least one supplemental product selected from said pool and the indication of the offer amount, to at least one of a retailer device, a web server, a point-of-sale terminal, and a user device.

4. The method of claim 1, in which the transaction comprises a purchase of a product, the transaction being conducted by a user and a retailer via a web site.

5. The method of claim 1, further comprising:
   receiving, by the controller device, an indication of at least one business rule for scoring potential supplemental products; and
   storing the indication of the at least one business rule.

6. The method of claim 1, further comprising:
   maintaining a transaction database;
   maintaining a database of potential supplemental products; and
   maintaining a user database.

7. The method of claim 1, further comprising one of the following:
   receiving an indication of an acceptance of an offer to purchase said selected at least one supplemental product; or receiving an indication of a rejection of an offer to purchase said selected at least one supplemental product.

8. The method of claim 1, wherein said scoring uses at least one of the following:
   a profit based scoring approach;
   a popularity based scoring approach;
   scoring based on preparation time of one or more products;
   scoring based on inventory level of one or more products;
   a discount based scoring approach; and
   a composite scoring approach.

9. The method of claim 1, wherein said determining a pool of at least one potential supplemental product comprises:
   identifying at least one product category involved in said transaction;
   determining at least one complementary product category; and
   selecting a pool of at least one supplemental product.

10. The method of claim 1, wherein said determining a pool of at least one potential supplemental product comprises:
    determining at least one potential replacement product; and
    selecting a pool of at least one supplemental product.

11. The method of claim 1, wherein said transaction information includes at least one of the following:
    a transaction subtotal amount;
    a user identifier;
    a user device identifier;
    a payment identifier;
    a destination identifier;
    a location identifier;
    a point-of-sale terminal location identifier;
    an employee identifier;
    a transaction identifier;
    a product identifier;
    a retailer identifier;
    a point-of-sale terminal identifier;
    a retailer identifier;
    a time for said transaction;
    a date for said transaction;
    credit history of a user;
    characteristics of a user;
    weather information;
    time of day information;
    day of week information;
    holiday information;
    competitor information;
    user demographic information;
    information regarding a user's brand loyalty;
    information regarding a user's brand indifference;
    product quantity information;
    product inventory information; and
    a price for a product being purchased during said transaction.

12. The method of claim 1, wherein said selecting comprises choosing a supplemental product that has a corresponding score higher than at least one other potential supplemental product.

13. The method of claim 1, wherein said selecting comprises choosing a supplemental product having a higher relative score than each of a plurality of potential supplemental products.

14. The method of claim 1, wherein said determining the offer amount for said at least one selected supplemental product comprises identifying a predetermined offer amount for said at least one selected supplemental product.

15. The method of claim 1, wherein said indication includes an offer to sell said at least one supplemental product selected from said pool.

16. The method of claim 1, wherein said indication includes an offer to sell said at least one supplemental product selected from said pool for the offer amount during said transaction.

17. A non-transitory computer readable medium storing instructions configured to direct a computing device to perform a method, the method comprising:
   receiving, by a controller device, information for a transaction;
   determining, by the controller device, a pool of at least one potential supplemental product;
   scoring, by the controller device, at least one potential supplemental product in said pool, based on (i) the information for the transaction and (ii) one or more of the following types of information:
      respective profitability of at least one potential supplemental product,
      respective popularity of at least one potential supplemental product,
      one or more preferences of the user,
      a respective number of at least one potential supplemental product in inventory,
      a business rule for scoring potential supplemental products, and
      a purchase history of the user;
   selecting for said transaction, by the controller device based on the scoring, at least one supplemental product from said pool;
   determining, by the controller device, an offer amount for said at least one selected supplemental product;
   providing, by the controller device, an indication of said at least one supplemental product selected from said pool and an indication of the offer amount.

18. An apparatus for conducting a transaction, comprising:
   a processor,
   a communication port connected to said processor; and
   a storage device connected to said process, said storage device storing instructions configured to direct the processor to perform:
      receiving information for a transaction;
      determining a pool of at least one potential supplemental product;
      scoring at least one potential supplemental product in said pool, based on (i) the information for the transaction and (ii) one or more of the following types of information:
         respective profitability of at least one potential supplemental product,
         respective popularity of at least one potential supplemental product,
         one or more preferences of the user,
         a respective number of at least one potential supplemental product in inventory,
         a business rule for scoring potential supplemental products, and
         a purchase history of the user;
      selecting for said transaction, based on the scoring, at least one supplemental product from said pool;
      determining, an offer amount for said at least one selected supplemental product;
      providing an indication of said at least one supplemental product selected from said pool and an indication of the offer amount.

* * * * *